US012236858B2

(12) United States Patent
Zhang et al.

(10) Patent No.: US 12,236,858 B2
(45) Date of Patent: Feb. 25, 2025

(54) DISPLAY SUBSTRATE AND DISPLAY APPARATUS HAVING DISPLAY REGIONS WITH DIFFERENT LIGHT TRANSMITTANCE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jingwen Zhang, Beijing (CN); Ziyang Yu, Beijing (CN); Yunsheng Xiao, Beijing (CN); Gukhwan Song, Beijing (CN); Cong Fan, Beijing (CN); Xiangdan Dong, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/802,364

(22) PCT Filed: Sep. 28, 2021

(86) PCT No.: PCT/CN2021/121300
§ 371 (c)(1),
(2) Date: Aug. 25, 2022

(87) PCT Pub. No.: WO2023/050057
PCT Pub. Date: Apr. 6, 2023

(65) Prior Publication Data
US 2024/0242666 A1 Jul. 18, 2024

(51) Int. Cl.
*G09G 3/00* (2006.01)
*G09G 3/3225* (2016.01)

(52) U.S. Cl.
CPC .......... *G09G 3/3225* (2013.01); *G09G 3/002* (2013.01); *G09G 2300/02* (2013.01); (Continued)

(58) Field of Classification Search
None
See application file for complete search history.

(56) References Cited

U.S. PATENT DOCUMENTS

2020/0006689 A1 1/2020 Heggemann et al.
2021/0104196 A1 4/2021 Yuan
(Continued)

FOREIGN PATENT DOCUMENTS

CN 109300948 A 2/2019
CN 109584801 A 4/2019
(Continued)

OTHER PUBLICATIONS

Yan, Design and implementation of AMOLED display pixel driver circuit, China Academic Journal, Jan. 15, 2020.

*Primary Examiner* — Amr A Awad
*Assistant Examiner* — Donna V Bocar
(74) *Attorney, Agent, or Firm* — Nath, Goldberg & Meyer; Joshua B. Goldberg

(57) ABSTRACT

A display substrate and a display apparatus are disclosed. The display substrate includes: a base substrate including a first and second display regions; a light transmittance of the first display region is greater than that of the second display region; first sub-pixels in the first display region. At least one first sub-pixel includes a first pixel circuit and a first light emitting device; the first pixel circuit includes a storage capacitor and a driving transistor; and a data writing sub-circuit configured to write a data voltage signal to a gate electrode of the driving transistor in response to a first and second scan signals; a reset sub-circuit configured to provide (Continued)

an initialization voltage signal to a first electrode of the first light emitting device in response to the second scan signal; and a luminescent control sub-circuit configured to transmit a driving current to the first light emitting device.

19 Claims, 19 Drawing Sheets

(52) U.S. Cl.
CPC ............... *G09G 2300/0426* (2013.01); *G09G 2300/0452* (2013.01); *G09G 2320/0626* (2013.01)

(56) References Cited

U.S. PATENT DOCUMENTS

| | | | | |
|---|---|---|---|---|
| 2021/0287610 | A1* | 9/2021 | Kim | G09G 3/3233 |
| 2021/0313415 | A1* | 10/2021 | Ma | H10K 59/353 |
| 2022/0310009 | A1* | 9/2022 | Wang | G09G 3/3233 |

FOREIGN PATENT DOCUMENTS

| | | | |
|---|---|---|---|
| CN | 21005273 | U | 2/2020 |
| CN | 110767085 | A | 2/2020 |
| CN | 111584599 | A | 8/2020 |
| CN | 111933080 | A | 11/2020 |
| CN | 112086070 | A | 12/2020 |
| CN | 112103320 | A | 12/2020 |
| CN | 112133253 | A | 12/2020 |
| CN | 112365844 | A | 2/2021 |
| CN | 112365849 | A | 2/2021 |
| CN | 112820841 | A | 5/2021 |
| CN | 112992995 | A | 6/2021 |
| WO | 2021/147083 | A1 | 7/2021 |

* cited by examiner

DISPLAY SUBSTRATE AND DISPLAY APPARATUS HAVING DISPLAY REGIONS WITH DIFFERENT LIGHT TRANSMITTANCE

This is a National Phase Application filed under 35 U.S.C. 371 as a national stage of PCT/CN2021/121300, filed Sep. 28, 2021, the content of which is hereby incorporated by reference in its entirety.

TECHNICAL FIELD

The present disclosure relates to the field of display technology, in particular to a display substrate and a display apparatus.

BACKGROUND

With the increase of diversified use demands of a user on a display apparatus and the appearance of design requirements of the display apparatus with a high screen screen-to-body ratio, in more and more display products, sensors, which are originally arranged outside a display region, are required to be arranged in the display region. That is, the sensors are arranged below a display screen. In this case, an area of the display screen corresponding to the sensors is required to have high transmittance and simultaneously may be used for displaying.

SUMMARY

The embodiment of the present disclosure provides a display substrate and a display apparatus.

In a first aspect, the present disclosure provides a display substrate, including: a base substrate including a first display region and a second display region on at least one side of the first display region, wherein a light transmittance of the first display region is greater than that of the second display region; and a plurality of first sub-pixels on the base substrate and in the first display region, wherein at least one of the plurality of first sub-pixels includes: a first pixel circuit and a first light emitting device, and the first pixel circuit includes: a storage capacitor and a driving transistor; a first electrode of the driving transistor is connected to a first voltage line; and two plates of the storage capacitor are respectively connected to a gate electrode and the first electrode of the driving transistor; the first pixel circuit further includes:

a data writing sub-circuit configured to write a data voltage signal to the gate electrode of the driving transistor in response to a first scan signal and a second scan signal;

a reset sub-circuit configured to provide an initialization voltage signal to a first electrode of the first light emitting device in response to the second scan signal; and a luminescent control sub-circuit configured to transmit a driving current output from the driving transistor to the first light emitting device in response to a luminescent control signal; and wherein an orthographic projection of the first electrode of the first light emitting device on the base substrate covers at least a part of an orthographic projection of the first pixel circuit on the base substrate.

In some embodiments, the data writing sub-circuit includes:

a first writing transistor, wherein a gate electrode of the first writing transistor is connected to a first scan line for providing the first scan signal, a second electrode of the first writing transistor is connected to the gate electrode of the driving transistor, and the first writing transistor is an oxide transistor; and a second writing transistor, wherein a gate electrode of the second writing transistor is connected to a second scan line for providing the second scan signal, a first electrode of the second writing transistor is connected to a data line for providing the data voltage signal, a second electrode of the second writing transistor is connected to a first electrode of the first writing transistor, and the second writing transistor is a polysilicon transistor.

In some embodiments, the first and second electrodes of the second writing transistor are arranged in a first direction, an orthographic projection of the second writing transistor on the base substrate is on a side of the storage capacitor in a second direction, the first writing transistor is on a side of the second writing transistor in the first direction, and the first and second directions intersect with each other.

In some embodiments, the data line includes: a data line main body and a curved portion, the data line main body extends in a first direction, an orthographic projection of the curved portion on the base substrate is on a side of an orthographic projection of the storage capacitor on the base substrate in a second direction and is curved toward the orthographic projection of the storage capacitor on the base substrate, the orthographic projection of the curved portion on the base substrate at least partially overlaps an orthographic projection of the gate electrode of the second writing transistor on the base substrate; and wherein the first and second directions intersect with each other.

In some embodiments, the orthographic projection of the curved portion on the base substrate at least partially overlaps the orthographic projection of the first electrode of the first light emitting device on the base substrate.

In some embodiments, the gate electrode of the first writing transistor includes a first gate electrode and a second gate electrode electrically connected to each other, an orthographic projection of the first gate electrode on the base substrate overlaps an orthographic projection of the second gate electrode on the base substrate; and the first pixel circuit further includes:

a first transfer electrode, wherein one terminal of the first transfer electrode is connected to the first gate electrode of the first writing transistor through a via, and the other terminal of the first transfer electrode is connected to the second gate electrode of the first writing transistor through a via; and a second transfer electrode connected to the first transfer electrode through a via, and connected to the first scan line through a via.

In some embodiments, the first pixel circuit further includes:

a third transfer electrode connected to the gate electrode of the second writing transistor through a via; and a fourth transfer electrode connected to the third transfer electrode through a via, and connected to the second scan line through a via.

In some embodiments, the first pixel circuit further includes a fifth transfer electrode, the data line is connected to the fifth transfer electrode through a via, and the fifth transfer electrode is connected to the first electrode of the second writing transistor through a via.

In some embodiments, the first pixel circuit further includes: a sixth transfer electrode; one terminal of the sixth transfer electrode is connected to the first electrode of the first writing transistor through a via, the other terminal of the sixth transfer electrode is connected to the second electrode of the second writing transistor through a via, and an orthographic projection of the sixth transfer electrode on the base substrate at least partially overlaps the orthographic projection of the first electrode of the first light emitting device on the base substrate.

In some embodiments, an orthographic projection of an active layer of the first writing transistor on the base substrate at least partially overlaps the orthographic projection of the first electrode of the first light emitting device on the base substrate, and an orthographic projection of an active layer of the second writing transistor on the base substrate is within the orthographic projection of the first electrode of the first light emitting device on the base substrate.

In some embodiments, the first pixel circuit further includes:

a seventh transfer electrode connected to the second electrode of the first writing transistor through a via, wherein the other terminal of the seventh transfer electrode is connected to the gate electrode of the driving transistor through a via; an orthographic projection of the seventh transfer electrode on the base substrate at least partially overlaps the orthographic projection of the first electrode of the first light emitting device on the base substrate.

In some embodiments, the first pixel circuit further includes: an eighth transfer electrode and a ninth transfer electrode; the first voltage line is connected to the ninth transfer electrode through a via, the ninth transfer electrode is connected to the eighth transfer electrode through a via, and the eighth transfer electrode is connected to the first electrode of the driving transistor through a via.

In some embodiments, the two plates of the storage capacitor include: a first plate and a second plate; the gate electrode of the driving transistor and the first plate have a one-piece structure, and the eighth transfer electrode is further connected to the second plate through a via; an orthographic projection of the second plate on the base substrate at least partially overlaps the orthographic projection of the first electrode of the first light emitting device on the base substrate.

In some embodiments, the luminescent control sub-circuit includes: a luminescent control transistor; a gate electrode of the luminescent control transistor is connected to a luminescent control line for providing the luminescent control signal, a first electrode of the luminescent control transistor is connected to the second electrode of the driving transistor, and a second electrode of the luminescent control transistor is connected to the first electrode of the first light emitting device.

In some embodiments, the first pixel circuit further includes: a tenth transfer electrode and an eleventh transfer electrode; the luminescent control line is connected to the eleventh transfer electrode through a via, the eleventh transfer electrode is connected to the tenth transfer electrode through a via, and the tenth transfer electrode is connected to the gate electrode of the luminescent control transistor through a via.

In some embodiments, the first and second electrodes of the luminescent control transistor are arranged in a second direction, and an orthographic projection of the storage capacitor on the base substrate is on a side of an orthographic projection of the first electrode of the luminescent control transistor on the base substrate in a first direction, and the first direction and the second direction intersect with each other.

In some embodiments, the reset sub-circuit includes: a reset transistor; a gate electrode of the reset transistor is connected to a second scan line for providing the second scan signal, a first electrode of the reset transistor is connected to an initialization voltage line for providing the initialization voltage signal, and a second electrode of the reset transistor is connected to a first electrode of the first light emitting device.

In some embodiments, the first pixel circuit further includes: a twelfth transfer electrode and a thirteenth transfer electrode; the initialization voltage line is connected to the thirteenth transfer electrode through a via, the thirteenth transfer electrode is connected to the twelfth transfer electrode through a via, and the twelfth transfer electrode is connected to the first electrode of the reset transistor through a via.

In some embodiments, the first pixel circuit further includes: a fourteenth transfer electrode, a fifteenth transfer electrode and a sixteenth transfer electrode; the first electrode of the light emitting device is connected to the sixteenth transfer electrode through a via, the sixteenth transfer electrode is connected to the fifteenth transfer electrode through a via, the fifteenth transfer electrode is connected to the fourteenth transfer electrode through a via, and the fourteenth transfer electrode is connected to the second electrode of the reset transistor through a via.

In some embodiments, the first and second electrodes of the reset transistor are arranged along a first direction, and an orthographic projection of the reset transistor on the base substrate is on a side of an orthographic projection of the storage capacitor on the base substrate along a second direction.

In some embodiments, the data writing sub-circuit includes a first writing transistor and a second writing transistor, and a gate electrode of the second writing transistor and the gate electrode of the reset transistor have a one-piece structure extending in a second direction.

In some embodiments, the display substrate includes: a first semiconductor layer, a first gate metal layer, a second gate metal layer, a second semiconductor layer, a third gate metal layer, a transparent wire layer, and a first electrode layer arranged in sequence in a direction away from the base substrate, wherein the first pixel circuit includes at least one polysilicon transistor and at least one oxide transistor; and the first semiconductor layer includes: an active layer, a first electrode, and a second electrode of each polysilicon transistor in the first pixel circuit; the first gate metal layer includes: a gate electrode of each polysilicon transistor in the first pixel circuit; the second gate metal layer includes: a first gate electrode of each oxide transistor in the first pixel circuit and a first plate of the storage capacitor; the second semiconductor layer includes: an active layer, a first electrode and a second electrode of each oxide transistor in the first pixel circuit; the third gate metal layer includes: a second plate of the storage capacitor; the transparent wire layer includes the first voltage line; the first electrode layer includes the first electrode of the first light emitting device.

In some embodiments, the data writing sub-circuit includes a first writing transistor having a gate electrode including a first gate electrode and a second gate electrode, the transparent wire layer further includes a first scan line, and the display substrate further includes a first source-drain metal layer and a second source-drain metal layer between the third gate metal layer and the first source-drain metal layer, wherein the second source-drain metal layer is on a side of the first source-drain metal layer away from the base substrate, and the first source-drain metal layer includes: a first transfer electrode, and the second source-drain metal layer includes: a second transfer electrode; the first scan line is connected to the second transfer electrode through a via, the second transfer electrode is connected to the first transfer electrode through a via, both terminals of the first transfer electrode are connected to first and second gate electrodes of the first writing transistor through vias, respectively.

In some embodiments, the data writing sub-circuit further includes a second writing transistor, the transparent wire layer further includes a second scan line, the first source-drain metal layer further includes a third transfer electrode, the second source-drain metal layer further includes a fourth transfer electrode; the second scan line is connected to the fourth transfer electrode through a via, the fourth transfer electrode is connected to the third transfer electrode through a via, and the third transfer electrode is connected to a gate electrode of the second writing transistor through a via.

In some embodiments, the transparent wire layer further includes a data line, the first source-drain metal layer further includes a fifth transfer electrode; the data line is connected to the fifth transfer electrode through a via, and the fifth transfer electrode is connected to a first electrode of the second writing transistor through a via.

In some embodiments, the first source-drain metal layer further includes: a sixth transfer electrode; one terminal of the sixth transfer electrode is connected to the first electrode of the first writing transistor through a via, and the other terminal of the sixth transfer electrode is connected to a second electrode of the second writing transistor through a via.

In some embodiments, the first source-drain metal layer further includes: a seventh transfer electrode; the seventh transfer electrode is connected to the second electrode of the first writing transistor through a via, wherein the other terminal of the seventh transfer electrode is connected to the gate electrode of the driving transistor through a via.

In some embodiments, the display substrate further includes a first source-drain metal layer and a second source-drain metal layer between the third gate metal layer and the first source-drain metal layer, wherein the second source-drain metal layer is on a side of the first source-drain metal layer away from the base substrate; the first source-drain metal layer includes an eighth transfer electrode, and the second source-drain metal layer includes a ninth transfer electrode; the first voltage line is connected to the ninth transfer electrode through a via, the ninth transfer electrode is connected to the eighth transfer electrode through a via, the eighth transfer electrode is connected to the first electrode of the driving transistor through a via, and the eighth transfer electrode is connected to the second plate of the storage capacitor through a via.

In some embodiments, the luminescent control sub-circuit includes: a luminescent control transistor; the display substrate further includes a first source-drain metal layer and a second source-drain metal layer between the third gate metal layer and the transparent wire layer, wherein the second source-drain metal layer is on a side of the first source-drain metal layer away from the base substrate;

the first source-drain metal layer includes: a tenth transfer electrode, the second source-drain metal layer includes: an eleventh transfer electrode, and the transparent wire layer further includes: a luminescent control line connected to the eleventh transfer electrode through a via, wherein the eleventh transfer electrode is connected to the tenth transfer electrode through a via.

In some embodiments, the reset sub-circuit includes: a reset transistor; the display substrate further includes a first source-drain metal layer and a second source-drain metal layer between the third gate metal layer and the transparent wire layer, wherein the second source-drain metal layer is on a side of the first source-drain metal layer away from the base substrate; and the first source-drain metal layer includes: a twelfth transfer electrode and a fourteenth transfer electrode; the second source-drain metal layer includes: a thirteenth transfer electrode and a fifteenth transfer electrode; the transparent wire layer includes an initialization voltage line, the initialization voltage line is connected to the thirteenth transfer electrode through a via, the thirteenth transfer electrode is connected to the twelfth transfer electrode through a via; the first electrode of the light emitting device is connected to the fifteenth transfer electrode through a via, the fifteenth transfer electrode is connected to the fourteenth transfer electrode through a via, and the fourteenth transfer electrode is connected to the second electrode of the reset transistor through a via.

In some embodiments, the plurality of first sub-pixels in the first display region are arranged in rows and columns, the first sub-pixels in the same column are arranged along a first direction, the first sub-pixels in the same row are arranged along a second direction, every two adjacent rows of the first sub-pixels form a repeating group, and the two rows of the first sub-pixels in the repeating group are arranged in a staggered manner:

the display substrate further includes:

a plurality of luminescent control lines for providing the luminescent control signals, wherein each luminescent control line corresponds to one of the repeating groups, different luminescent control lines correspond to different repeating groups, and each luminescent control line is connected to first pixel circuits of first sub-pixels in the corresponding repeating group;

a plurality of first scan lines for providing the first scan signals, wherein each first scan line corresponds to one of the repeating groups, different first scan lines correspond to different repeating groups, each first scan line is connected to the first pixel circuits of first sub-pixels in the corresponding repeating group;

a plurality of second scan lines for providing the second scan signals, wherein each second scan line corresponds to one of the repeating groups, different second scan lines correspond to different repeating groups, and each second scan line is connected to the first pixel circuits of first sub-pixels in the corresponding repeating group;

a plurality of initialization voltage lines for providing the initialization voltage signals, wherein each initialization voltage line corresponds to one of the repeating groups, different initialization voltage lines correspond to different repeating groups, each initialization voltage line is connected to the first pixel circuits of the first sub-pixels in the corresponding repeating group; and a plurality of data lines for providing the data voltage signals, wherein each data line corresponds to one column of the repeating group, different data lines correspond to different columns of the first sub-pixels, and each data line is connected to the first pixel circuits in a corresponding column of first sub-pixels.

In some embodiments, in a same repeating group, one row of first sub-pixels are sub-pixels of a first color, and the other row of sub-pixels includes sub-pixels of a second color and sub-pixels of a third color arranged alternately, the luminescent control line includes: a control line main body extending in a second direction and a control line lead-out portion extending in a first direction; and in a same repeating group, the first pixel circuits in one row of first sub-pixels are connected to the control line main body, and the first pixel circuits in the other row of first sub-pixels are connected to the control line leading-out portion.

In some embodiments, the first scan line includes a scan line main body and a scan line lead-out portion; the scan line main body includes a plurality of scan line segments sequentially arranged in the second direction, the plurality of scan line segments are sequentially connected together such that the scan line main body is bent; the scan line leading-out portion extends in the first direction; and in a same repeating group, the first pixel circuits in one row of first sub-pixels are connected to the scan line main body, and the first pixel circuits in the other row of first sub-pixels are connected to the scan line leading-out portion.

In some embodiments, the display substrate further includes:

a plurality of second sub-pixels on the base substrate and in the second display region, wherein at least one of the plurality of second sub-pixels includes: a second pixel circuit and a second light emitting device; the second pixel circuit is configured to supply a driving current to the second light emitting device.

In a second aspect, an embodiment of the present disclosure further provides a display apparatus, which includes the above display substrate.

In some embodiments, the display apparatus further includes at least one image sensor, an orthographic projection of the at least one image sensor on the base substrate is in the first display region.

BRIEF DESCRIPTION OF DRAWINGS

The accompanying drawings, which are provided for further understanding of the present disclosure and constitute a part of this specification, are for explaining the present disclosure together with the following exemplary embodiments, but are not intended to limit the present disclosure. In the drawings.

DETAIL DESCRIPTION OF EMBODIMENTS

Figure 1:
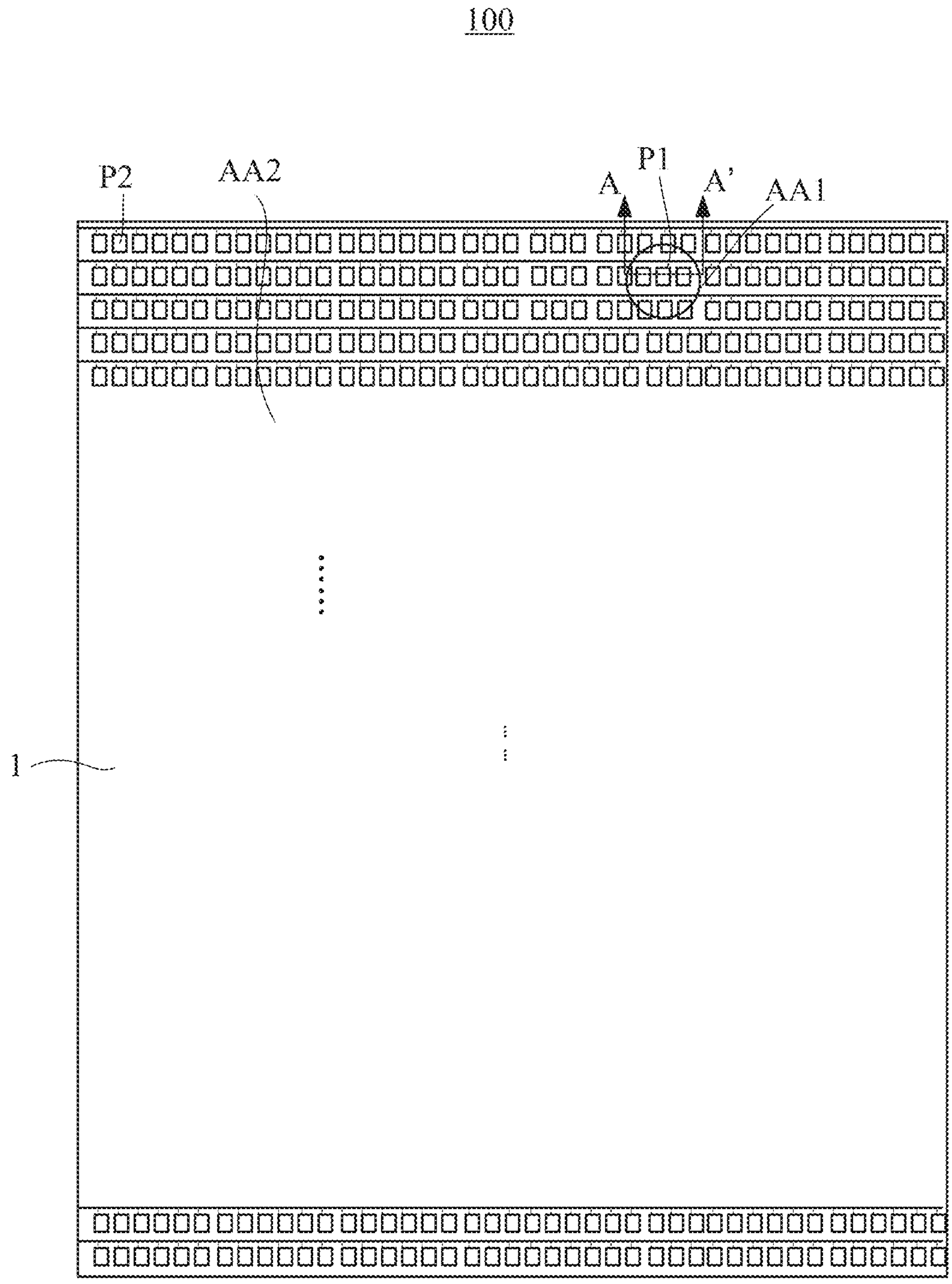
FIG. 1 is a schematic plan view of a display apparatus according to some embodiments of the present disclosure.

To make objects, technical solutions and advantages of embodiments of the present disclosure more clear, the technical solutions of the embodiments of the present disclosure will be clearly and completely described below with reference to the accompanying drawings. Obviously, the described embodiments are only a few embodiments of the present disclosure, and not all embodiments. All other embodiments, which may be derived by one of ordinary skill in the art from the described embodiments of the present disclosure without any inventive effort, are within the scope of the present disclosure.

It should be noted that, in the drawings, a size and a relative size of each element may be exaggerated for clarity and/or description. As such, the size and the relative size of the element are not necessarily limited to those shown in the drawings. In the description and drawings, the same or similar reference numerals denote the same or similar elements.

When an element is referred to as being "on", "connected to" or "coupled to" another element, the element may be directly on, connected or coupled to the another element, or there may be any intervening element therebetween. However, when an element is referred to as being "directly on", "directly connected to" or "directly coupled to" another element, there is no intervening element therebetween. Further, the term "connected" may refer to a physical or electrical connection.

It should be noted that, although the terms "first", "second", etc. may be used herein to describe various components, members, elements, regions, layers and/or portions, these components, members, elements, regions, layers and/or portions should not be limited by these terms. Rather, these terms are used to distinguish one component, member, element, region, layer and/or portion from another component, member, element, region, layer and/or portion. Thus, for example, a first component, a first member, a first element, a first region, a first layer and/or a first portion could be termed as a second component, a second member, a second element, a second region, a second layer and/or a second portion without departing from the teachings of the present disclosure.

It should be noted that, in the present disclosure, a term "same layer" or "arranged in a same layer" refers to a layer structure formed by firstly forming a film layer and then patterning the film layer through one patterning process with a same mask plate. Specific patterns in the formed layer structure may be continuous or discontinuous. That is, a plurality of elements, components, structures and/or portions located in "the same layer" are made of the same material and are formed through the same patterning process. Generally, the plurality of elements, components, structures and/or portions located in "the same layer" have substantially the same thickness, but distances from a base substrate to the plurality of elements, components, structures and/or portions located in "the same layer" are not necessarily the same.

It will be understood by one of ordinary skill in the art that, in the present disclosure, unless otherwise specified, a term "continuously extending", "integral structure", "one-piece structure" or the like means that a plurality of elements, components, structures and/or portions are located in "the same layer" and are typically formed through the same patterning process during fabrication, without spaces or breaks among them, but rather as a continuously extending structure.

Figure 2:
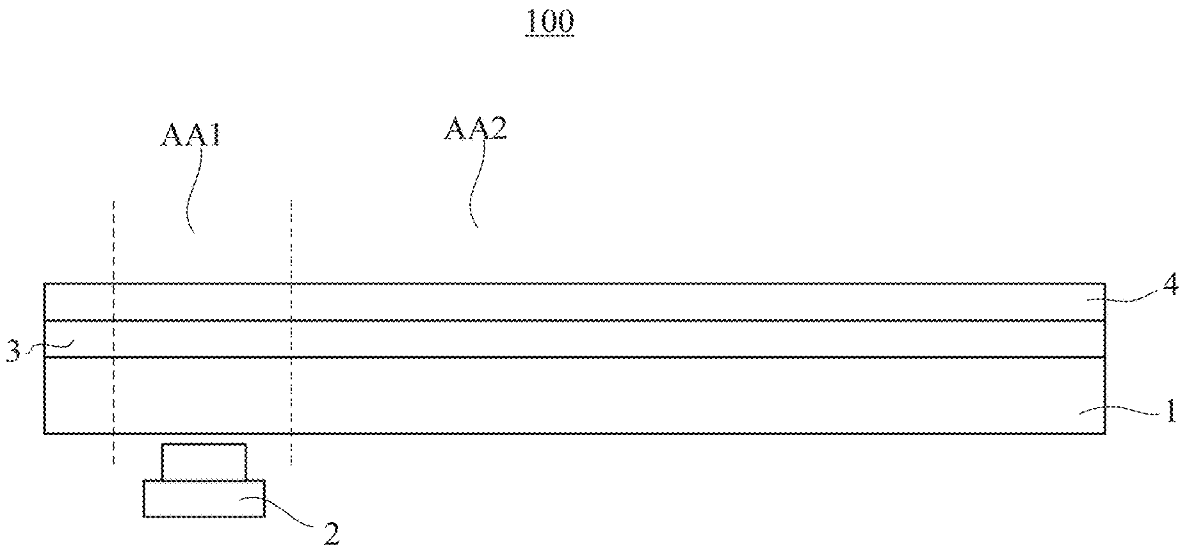
FIG. 2 is a sectional view of a display apparatus taken along a line A-A' in FIG. 1 according to some embodiments of the present disclosure.

FIG. 1 is a schematic plan view of a display apparatus according to some embodiments of the present disclosure, and schematically shows a plan structure of a display substrate included in the display apparatus. FIG. 2 is a sectional view of a display apparatus taken along a line A-A' in FIG. 1 according to some embodiments of the present disclosure. The display substrate may be an electroluminescent display substrate, such as an OLED display substrate. As shown in FIG. 1, the display substrate 100 includes a display region, which may include a first display region AA1 and a second display region AA2, for example, the first display region AA1 and the second display region AA2 shown in FIG. 1. For example, the second display region AA2 at least partially surrounds (e.g., completely surrounds) the first display region AA1.

As shown in FIG. 2, the display substrate 100 may include a base substrate 1. An image sensor 2 may be disposed on a back side (shown as a lower side in FIG. 2, for example, a side opposite to a light outgoing direction when displaying) of the first display region AA1 of the base substrate 1, and the first display region AA1 may satisfy the imaging requirement of the image sensor 2 on light transmittance.

For example, the light transmittance of the first display region AA is greater than that of the second display region AA2. The image sensor 2 is configured to receive light from a display side (an upper side in FIG. 2, for example, the light outgoing direction of the display substrate, or a direction in which human eyes are present when displaying) of the display substrate 100, so that operations such as image capturing, distance sensing, light intensity sensing, and the like may be performed, and the light is irradiated onto the image sensor through, for example, the first display region AA1, so as to be sensed by the image sensor.

It should be noted that, in the illustrated exemplary embodiment, the second display region AA2 completely surrounds the first display region AA1, but embodiments of the present disclosure are not limited thereto. For example, in other embodiments, the first display region AA1 may be located at an upper edge of the display substrate, e.g., the first display region AA1 is surrounded on three sides by the second display region AA2, and an upper side of the first display region AA1 is flush with that of the display substrate.

For example, the first display region AA1 may have a circular, elliptical, polygonal, or rectangular shape, and the second display region AA2 may have a circular, elliptical, or rectangular shape, but the embodiment of the present disclosure is not limited thereto. For another example, each of the first display region AA1 and the second display region AA2 may have a rectangular, rounded rectangular shape or any other suitable shape.

In the display substrate shown in FIGS. 1 to 2, the OLED display technology may be employed. An OLED display substrate has the advantages of wide viewing angle, high contrast, fast response, low power consumption, foldability, flexibility and the like, and is more and more widely applied to a display product. With the development and deep application of the OLED display technology, a demand for a display screen with a high screen-to-body ratio is increasingly strong. In the display substrate shown in FIGS. 1 to 2, an under-screen camera is employed. Therefore, holes may be prevented from being formed in the display screen, the screen-to-body ratio may be improved, and a better visual experience is achieved.

For example, the display substrate may include the base substrate 1 and layers disposed on the base substrate 1. For example, the display substrate may further include a driving circuit layer, a light emitting device layer, and an encapsulation layer on the base substrate 1. For example, the driving circuit layer 3 and the light emitting device layer 4 are schematically illustrated in FIG. 2. The driving circuit layer 3 includes a driving circuit structure, and the light emitting device layer 4 includes a light emitting device such as an OLED. The driving circuit structure controls a light emitting device of each sub-pixel to emit light, so as to realize a display function. The driving circuit structure includes a thin film transistor, a storage capacitor, and various signal lines. The signal lines include gate lines, data lines, power lines, etc. to supply various signals such as control signals, data signals, power voltages, etc. to the pixel driving circuit in each sub-pixel, respectively.

For example, the first display region AA1 may be provided to correspond to an under-screen camera, i.e., the first display region AA1 may be an under-screen camera region. For example, the display substrate 100 includes the first display region AA1, and the first display region AA1 may have a circular shape, a substantially circular shape, an elliptical shape, a polygonal shape, or the like.

For example, referring to FIGS. 1 and 2 in combination, in the illustrated embodiment, one image sensor 2 may be disposed correspondingly at the first display region AA1. However, embodiments of the present disclosure are not limited thereto, and in other embodiments, more first display regions AA1 and image sensors 2 may be provided. In addition, a shape of the first display region may alternatively be determined according to a shape of a hardware structure to be installed. For example, an orthographic projection of the first display region AA1 on the base substrate may have one or more of the following shapes: circular, elliptical, rectangular, rounded rectangular, square, diamond, trapezoidal, polygonal shapes, and the like, as well as various combinations thereof.

A display region is provided in the display substrate to have a higher light transmittance than that of a normal display region, and the hardware structure such as a camera is arranged below the display substrate, so that functions such as shooting under a screen can be realized, the screen-to-body ratio can be improved, and a full-screen can be realized.

In the related art, a portion of the second display region close to the first display region is formed as a transition region. In the related art, in some embodiments, a pixel circuit, to which an anode of a first light emitting device in the first display region is connected, is disposed in the transition region. In this way, a resolution of the transition region is substantially reduced. In addition, when the pixel circuit to which the first light emitting device is connected is disposed in the transition region, the first light emitting device is connected to the corresponding pixel circuit through a transparent wire, but lengths of the transparent wires between different first light emitting devices and their corresponding pixel circuits are not necessarily equal to each other, so that brightness of light emitted by the first light emitting devices may not be consistent with each other.

An embodiment of the present disclosure provides a display substrate, as shown in FIGS. 1 and 2. The display substrate 100 includes: the base substrate 1 and a plurality of first sub-pixels P1, the base substrate includes the first display region AA1 and the second display region AA2 positioned on at least one side of the first display region AA1, and the light transmittance of the first display region AA1 is greater than that of the second display region AA2.

The plurality of first sub-pixels P1 are disposed on the base substrate 1 and are positioned in the first display region AA1. At least one first sub-pixel P1 includes: a first pixel circuit and a first light emitting device. Optionally, a plurality of second sub-pixels P2 are further disposed on the base substrate 1, and located in the second display region AA2. Each of the plurality of second sub-pixels P2 includes: a second pixel circuit and a second light emitting device.

Figure 3:
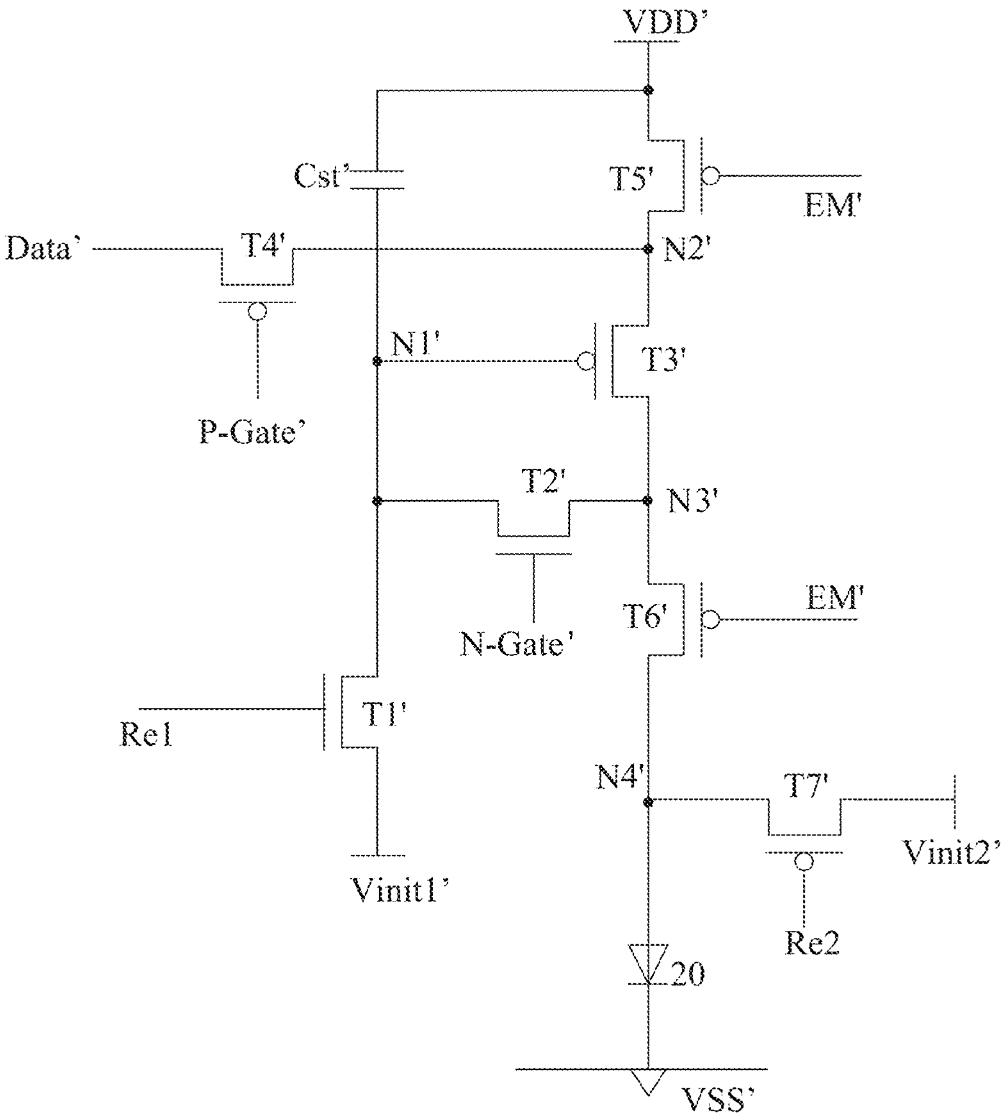
FIG. 3 is an equivalent circuit diagram of a second pixel circuit according to some embodiments of the present disclosure.

FIG. 3 is an equivalent circuit diagram of a second pixel circuit according to some embodiments of the present disclosure. As shown in FIG. 3, the second pixel circuit may include: a first reset transistor T1', a threshold compensating transistor T2', a driving transistor T3', a data writing transistor T4', a first luminescent control transistor T5', a second luminescent control transistor T6', a second reset transistor T7', and a storage capacitor Cst'.

A gate electrode of the first reset transistor T1' is connected to a first reset line Re1, a first electrode of the first reset transistor T1', a gate electrode of the driving transistor T3', and a first electrode of the threshold compensating transistor T2' are connected to a first node N1', and a second electrode of the first reset transistor T1' is connected to a first initialization voltage line Vinit1'. A gate electrode of the threshold compensating transistor T2' is connected to a first scan line N-Gate', and a second electrode of the threshold compensating transistor T2, a second electrode of the driving transistor TY, and a first electrode of the second luminescent control transistor T6' are connected to a third node N3'. A gate electrode of the data writing transistor T4' is connected to a second scan line P-Gate', a first electrode of the data writing transistor T4' is connected to a data line Data', a second electrode of the data writing transistor T4', a first electrode of the driving transistor T3', and a second electrode of the first luminescent control transistor T5' are connected to a second node N2'. A first electrode of the first luminescent control transistor T5' is connected to a first voltage line VDD'. A gate electrode of the second reset transistor T7' is connected to a second reset line Re2, a first electrode of the second reset transistor T7' and a second electrode of the second luminescent control transistor T6' are connected to a fourth node N4' and a second electrode of the second reset transistor T7' is connected to a second initialization voltage line Vinit2'. A first electrode of the second light emitting device 20 is connected to the fourth node N4', and a second electrode of the second light emitting device 20 is connected to a second voltage line VSS'. The first electrode of the second light emitting device 20 is an anode and the second electrode of the second light emitting device 20 is a cathode. The first initialization voltage line Vinit1' and the second initialization voltage line Vinit2' may be the same or different.

It should be noted that, the transistor used in the embodiments of the present disclosure may be a thin film transistor or a field effect transistor or any other switching device with the same characteristics, and the thin film transistor may include an oxide semiconductor thin film transistor, an amorphous silicon thin film transistor, a polysilicon thin film transistor, or the like. A source and drain electrodes of a transistor may be symmetrical in physical structure, so that there may be no difference therebetween in physical structure. In the embodiments of the present disclosure, in order to distinguish, in addition to a gate electrode as a control electrode, one electrode of a transistor is directly described as a first electrode, and the other electrode is directly described as a second electrode, so that the first electrode and the second electrode of each of all or some of the transistors in the embodiments of the present disclosure may be interchanged as necessary.

In one example, the first reset transistor T1' and the threshold compensating transistor T2' may be oxide transistors and N-type transistors. The other transistors T3' to T7' are all polysilicon transistors and P-type transistors. The polysilicon transistor is, for example, a low temperature polysilicon transistor in the embodiment of the present disclosure. The first reset transistor T1', which is the oxide transistor, has a small leakage current in a luminescent stage of the second light emitting device 20, so that when the display substrate performs a low frequency display, the brightness of the second light emitting device can be better maintained in a display period for each frame of picture.

Figure 4:
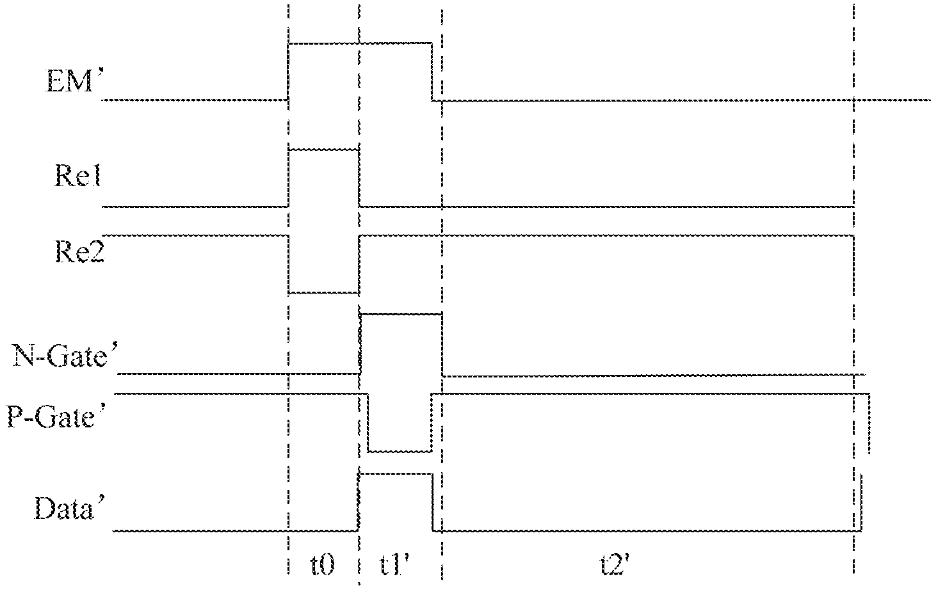
FIG. 4 is a timing diagram of a second pixel circuit shown in FIG. 3.

FIG. 4 is a timing diagram of the second pixel circuit shown in FIG. 3. As shown in FIG. 4, in some examples, an operation process of the second pixel circuit may include: an initialization stage t0, a data writing stage t1' and a luminescent stage t2'. In the initialization stage t0, the first reset line Re1 supplies a high level signal, and the second reset line Re2 supplies a low level signal, at which time the first reset transistor T1' and the second reset transistor T7' are turned on, and an initialization voltage on the first initialization voltage line Vinit1' is transmitted to the first node N1', thereby resetting a voltage at the gate electrode of the driving transistor T3'. An initialization voltage on the second initialization voltage line Vinit2' is transmitted to the second node N2', thereby resetting a voltage at the first electrode of the second light emitting device 20. In the data writing stage t1', the second scan line P-Gate' supplies a low level signal, and the first scan line N-Gate' supplies a high level signal. When the first scan line N-Gate' supplies a high level signal, the threshold compensating transistor T2' is turned on, the gate electrode and the first electrode of the driving transistor T3 are shorted, and the driving transistor T3' is equivalent to a diode; when the second scan line P-Gate' supplies the low level signal, the data writing transistor T4' is turned on, and a data voltage signal written on the data line Data' is written into the gate electrode of the driving transistor T3', until the driving transistor T3' is turned off. A voltage at the gate electrode of the driving transistor T3' is Vdata'+Vth' (Vth<0, Vth is a threshold voltage of the driving transistor T3', Vdata' is a data voltage supplied from the data line Data'), and is stored in the storage capacitor Cst'. Voltages at both terminals of the storage capacitor Cst' are Vdata'+Vth' and Vdd', respectively, and Vdd' is a voltage on the first voltage line Vdd'. In this stage, since a writing time of the data writing transistor T4' is long, the data voltage on the data line Data' may be sufficiently written into the gate electrode of the driving transistor T3'. In the luminescent stage, a luminescent control line EM' supplies a low level signal, the first and second luminescent control transistors T5' and T6' are both turned on, the first electrode of the driving transistor T3' is electrically connected to the first voltage line VDD', and the voltage at the first electrode of the driving transistor T3' is instantaneously changed to Vdd' from Vdata' in the previous stage. The second light emitting device 20 is driven by the driving transistor T3 to emit light. At this time, the driving transistor T3 operates in a saturation region, the voltage at the gate electrode of the driving transistor T3 is Vdata'+Vth', and a voltage at the first electrode of the driving transistor T3' is Vdd', so that a voltage between the gate and first electrodes of the driving transistor T3' is: Vgs'32 (Vdata'+Vth')−Vdd'.

A driving current of the driving transistor T3 is:

$$I_D = \beta'(Vgs' - Vth')^2 = \beta'(Vdata' + Vth' - Vdd' - Vth')^2 = \beta'(Vdata' - Vdd')^2$$

where β' is a constant related to characteristics of the driving transistor T3'.

$$\beta' = \frac{1}{2}\mu_n C_{ox}\left(\frac{W}{L}\right),\ \mu_n$$

is an electron mobility of the driving transistor T3', $C_{ox}$ is an insulation capacitance per unit area, and W/L is a width-to-length ratio of the driving transistor T3'.

It should be noted that, the period in which the second reset line Re2 supplies the low level signal may not be in the initialization stage t0, as long as it is ensured that the period in which the second reset line Re2 supplies the low level signal before the luminescent stage t2'. For example, the second reset line Re2 may also supply the low level signal in the data writing stage t1. In the data writing stage t1', the period in which the second scan line P-Gate' supplies the low level signal may be the same as the period in which the first scan line N-Gate' supplies the high level signal, or may be in the period in which the first scan line N-Gate' supplies the high level signal.

It should be noted that, the structure of 7T1C adopted by the second pixel circuit is only exemplary. Alternatively, the second pixel circuit may adopt other structures, such as, 9T1C.

Figure 5A:
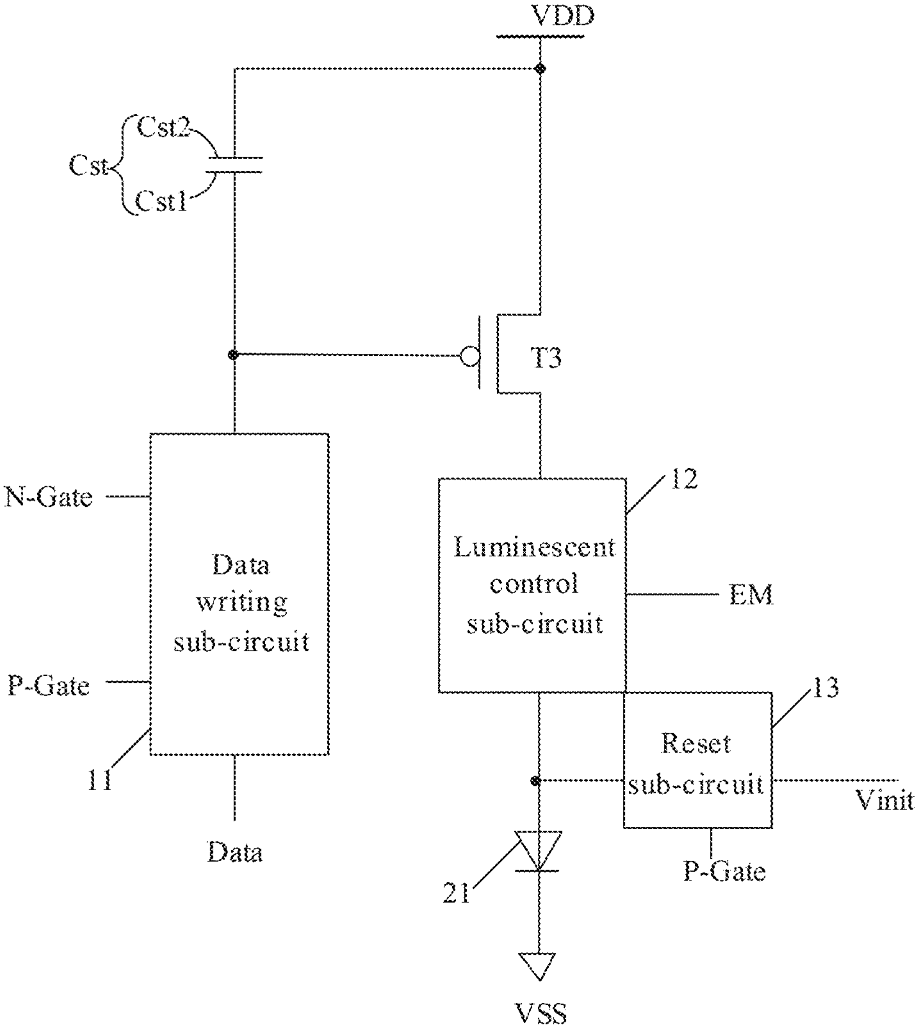
FIG. 5A is a schematic circuit diagram of a first pixel circuit according to some embodiments of the present disclosure.

FIG. 5A is a schematic circuit diagram of a first pixel circuit according to some embodiments of the present disclosure. As shown in FIG. 5A, the first pixel circuit includes: a storage capacitor Cst and a driving transistor T3, a first electrode of the driving transistor T3 is connected to the first voltage line VDD, and two plates of the storage capacitor Cst are respectively connected to a gate electrode and a first electrode of the driving transistor T3; the first pixel circuit further includes: a data writing sub-circuit 11, a reset sub-circuit 13, and a luminescent control sub-circuit 12. The data writing sub-circuit 11 is connected to a first scan line N-Gate for supplying a first scan signal and a second scan line P-Gate for supplying a second scan signal, and the data writing sub-circuit 11 is configured to write a data voltage signal to the gate electrode of the driving transistor T3 in response to the first scan signal and the second scan signal. The reset sub-circuit 13 is connected to the second scan line P-Gate, and the reset sub-circuit 13 is configured to provide an initialization voltage signal to a first electrode of a first light emitting device 21 in response to the second scan signal. The luminescent control sub-circuit 12 is connected to a luminescent control line EM, and is configured to transmit the driving current output from the driving transistor to the first light emitting device 21 in response to a luminescent control signal. An orthographic projection of the first electrode of the first light emitting device 21 on the base substrate 1 covers at least a part of an orthographic projection of the first pixel circuit on the base substrate 1.

In an embodiment of the present disclosure, the operation process of the first pixel circuit includes: a writing and resetting stage and a luminescent stage, the first scan line N-Gate provides the first scan signal, the second scan line P-Gate provides the second scan signal, the data line provides a data voltage signal. At this time, an initialization voltage signal on the initialization voltage line is written into the first electrode of the first light emitting device 21, the data writing sub-circuit 11 writes the data voltage signal into the gate electrode of the driving transistor, and a voltage stored in the storage capacitor is Vdata−Vdd. In the luminescent stage, the luminescent control line provides the luminescent control signal, the first light emitting device 21 is driven by the driving transistor T3 to emit light, and the driving transistor T3 operates in the saturation region. A voltage between the gate electrode and the first electrode of the driving transistor T3 is: Vgs=Vdata−Vdd, a driving current of the driving transistor T3 is as follows:

$$I_D = \beta(V_{gs} - V_{th})^2 = \beta(Vdata - Vdd - Vth)^2$$

where Vdd is a voltage on the first voltage line Vdd, Vdata is a voltage of the data voltage signal provided by the data line Data, Vth is a threshold voltage of the driving transistor T3, and β is a constant related to characteristics of the driving transistor T3.

In the embodiment of the present disclosure, the orthographic projection of the first electrode of the first light emitting device 21 on the base substrate 1 covers at least a part of the orthographic projection of the first pixel circuit on the base substrate 1. That is, the first pixel circuit to which the first light emitting device 21 is connected is disposed in the first display region, and does not occupy any space of the second display region, which does not affect the resolution of the first display region. Moreover, since the orthographic projection of the first electrode of the first light emitting device 21 on the base substrate 1 covers the orthographic projection of the first pixel circuit on the base substrate 1, distances between different first light emitting devices 21 and the corresponding first pixel circuits connected to the first light emitting devices 21 may be substantially the same, thereby improving display uniformity of the first display region. Moreover, in the first pixel circuit, the data writing sub-circuit 11 directly writes the data voltage signal to the gate electrode of the driving transistor T3, and it is not required to provide the reset sub-circuit 13 for resetting the gate electrode of the driving transistor T3, so that the structure of the first pixel circuit may be simplified, and the influence of the first pixel circuit on the light transmittance of the first display region may be reduced as much as possible.

Figure 5B:
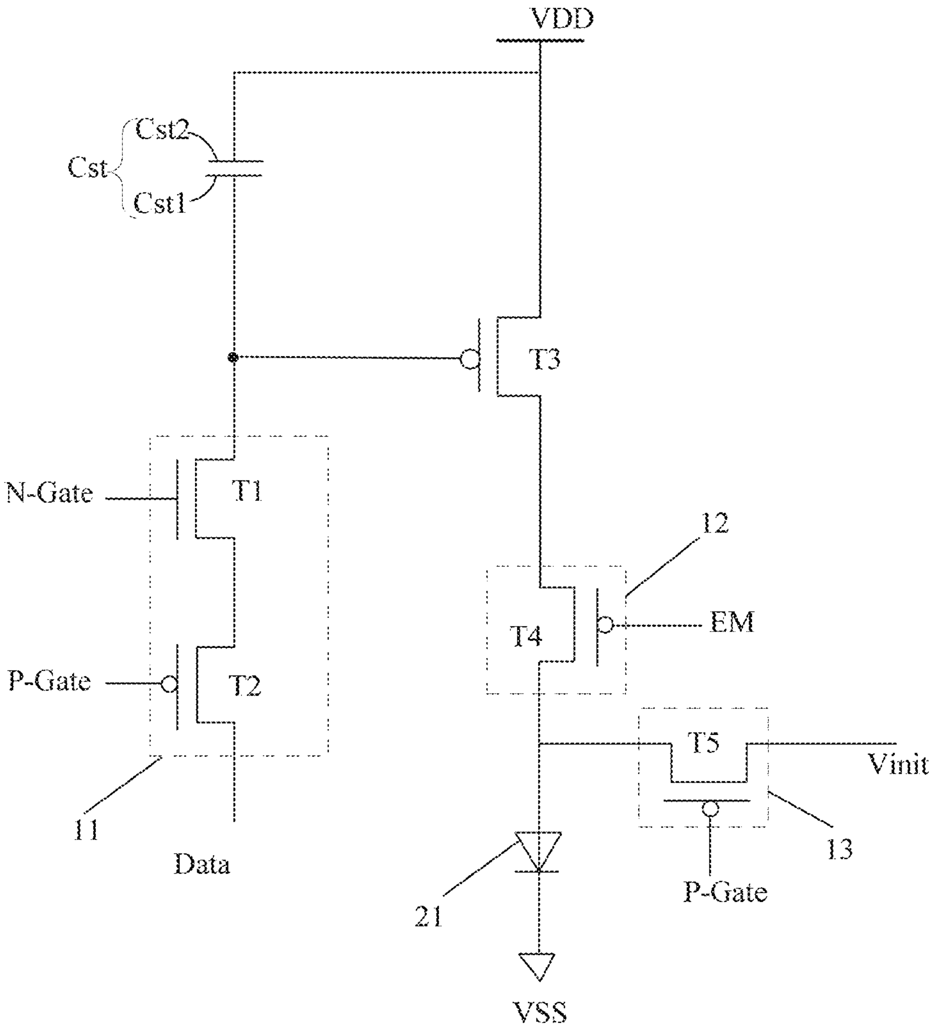
FIG. 5B is a schematic circuit diagram of a first pixel circuit according to some embodiments of the present disclosure.

FIG. 5B is a schematic circuit diagram of a first pixel circuit according to some embodiments of the present disclosure. The first pixel circuit shown in FIG. 5B is a specific implementation of the first pixel circuit in FIG. 5A. As shown in FIG. 5B, the first pixel circuit includes the storage capacitor Cst, the driving transistor T3, the data writing sub-circuit 11, the reset sub-circuit 13, and the luminescent control sub-circuit 12. The data writing sub-circuit 11 includes, a first writing transistor T1 and a second writing transistor T2, a gate electrode of the first writing transistor T1 is connected to the first scan line N-Gate for supplying the first scan signal, and a second electrode of the first writing transistor T1 is connected to the gate electrode of the driving transistor T3. A gate electrode of the second writing transistor T2 is connected to the second scan line P-Gate for supplying the second scan signal, a second electrode of the second writing transistor T2 is connected to a first electrode of the first writing transistor T1, and a first electrode of the second writing transistor T2 is connected to the data line Data for supplying the data voltage signal.

The luminescent control sub-circuit 12 includes a luminescent control transistor T4, a gate electrode of the luminescent control transistor T4 is connected to the luminescent control line EM for supplying the luminescent control signal, a first electrode of the luminescent control transistor T4 is connected to the second electrode of the driving transistor T3, and a second electrode of the luminescent control transistor T4 is connected to the first electrode of the first light emitting device 21.

The reset sub-circuit 13 includes a reset transistor T5, a gate electrode of the reset transistor T5 is connected to the second scan line P-Gate for supplying the second scan signal, a first electrode of the reset transistor T5 is connected to the initialization voltage line for supplying the initialization voltage signal, and a second electrode of the reset transistor T5 is connected to the first electrode of the first light emitting device 21.

In some examples, the reset transistor T5, the second writing transistor T2, the driving transistor T3, and the luminescent control transistor T4 may all be low temperature polysilicon transistors, and P-type transistors. The first writing transistor T1 may be an oxide transistor and an N-type transistor.

Figure 6A:
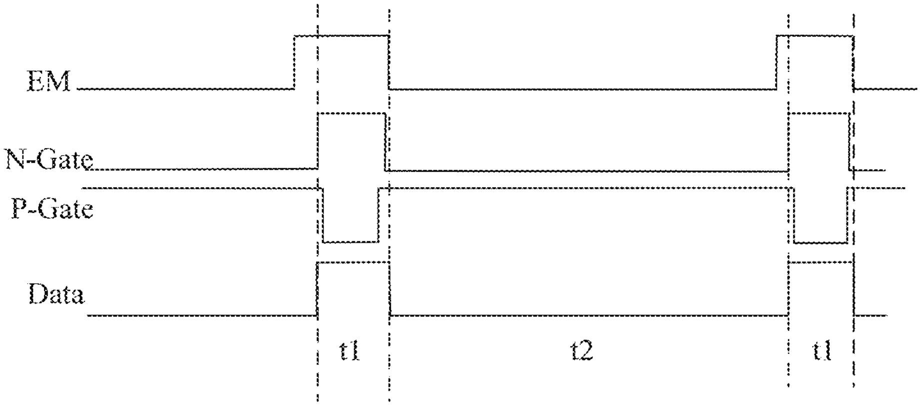
FIG. 6A is a timing diagram illustrating an operation of a first pixel circuit in FIG. 5B.
Figure 6B:
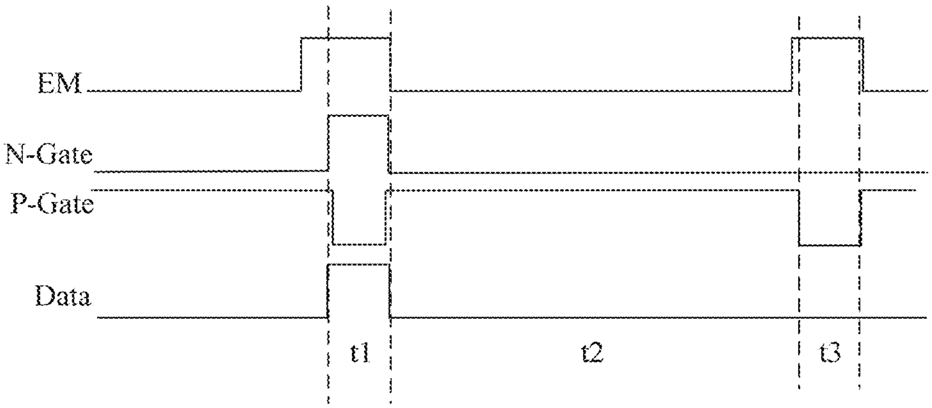
FIG. 6B is another timing diagram illustrating an operation of a first pixel circuit in FIG. 5B.

FIG. 6A is a timing diagram illustrating an operation of a first pixel circuit in FIG. 5B. FIG. 6B is another timing diagram illustrating an operation of a first pixel circuit in FIG. 5B. When the display substrate is used for a high frequency display (for example, a display frequency is greater than or equal to 60 Hz), the timing diagram of an operation of the first pixel circuit in FIG. 5B is shown in FIG. 6A. The operation process of the first pixel circuit includes: a writing and resetting stage t1 and a luminescent stage t2. In the writing and resetting stage t1, the first scan line N-Gate supplies the first scan signal at a high level, the second scan line P-Gate supplies the second scan signal at a low level, the data line Data supplies the data voltage signal, the luminescent control line EM supplies a high level signal. At this time, the initialization voltage signal on the initialization voltage line Vinit is written into the first electrode of the first light emitting device 21, the data writing sub-circuit 11 writes the data voltage signal into the gate electrode of the driving transistor T3, and a voltage stored in the storage capacitor Cst is Vdata−Vdd. In the luminescent stage t2, the luminescent control line EM supplies the luminescent control signal at a low level, the first light emitting device 21 is driven by the driving transistor T3 to emit light. At this time, the driving transistor T3 operates in the saturation region, and a voltage between the gate electrode and the first electrode of the driving transistor T3 is: Vgs=Vdata−Vdd, and the driving current of the driving transistor T3 is $\beta(Vdata-Vdd-Vth)^2$. The period in which the second scan line P-Gate supplies the low level signal may be the same as the period in which the first scan line N-Gate supplies the high level signal, or within the period in which the first scan line N-Gate supplies the high level signal, and the period in which the first scan line N-Gate supplies the high level signal and the period in which the second scan line P-Gate supplies the low level signal may be within the period in which the luminescent control line EM supplies the high level signal.

When the display substrate is used for a low frequency display (for example, the display frequency is less than 60 Hz), the timing diagram of the operation of the first pixel circuit in FIG. 5B is as shown in FIG. 6B. In addition to the writing and resetting stage t1 and the luminescent stage t2, the operation process of the first pixel circuit further includes: an anode resetting stage T3. In the anode resetting stage T3, the luminescent control line EM supplies a high level signal, the first scan line N-Gate supplies a low level signal, and the second scan line P-Gate supplies a low level signal, so that the reset transistor T5 resets the voltage at the first electrode of the first light emitting device 21. The reason why the operation of the first pixel circuit includes the anode resetting stage t3 is that: the first light emitting device 21 does not emit light in the writing and resetting stage t1. If the number of times that the first light emitting device 21 does not emit light is small in each second, the human eye may easily see the flicker of the picture. With the anode resetting stage t3, the number of times that the first light emitting device 21 does not emit light may be increased, and the human eye may be prevented from seeing the flicker of the picture.

In the first pixel circuit shown in FIGS. 5A and 5B, the threshold compensating transistor is not provided. When the data voltage writing is performed, the data voltage signal is directly written to the gate electrode of the driving transistor T3, without passing through the threshold compensating transistor, so that a writing speed of the data voltage signal is extremely high, which may be applied to a display product of a high frequency display. In addition, the first writing transistor T1 is an oxide transistor, and the leakage current thereof is small in the luminescent stage, so that the brightness of the first light emitting device 21 in the luminescent stage is more stable, and therefore, the first pixel circuit may also be applied to a display product of a low frequency display.

In some embodiments of the present disclosure, the display substrate includes: a first semiconductor layer, a first gate insulating layer, a first gate metal layer, a second gate insulating layer, a second gate metal layer, a first interlayer dielectric layer, a second semiconductor layer, a third gate insulating layer, a third gate metal layer, a second interlayer dielectric layer, a first source-drain metal layer, a first planarization layer, a second source-drain metal layer, a second planarization layer, a transparent wire layer and a third planarization layer, arranged in sequence in a direction away from the base substrate 1.

Figure 7:
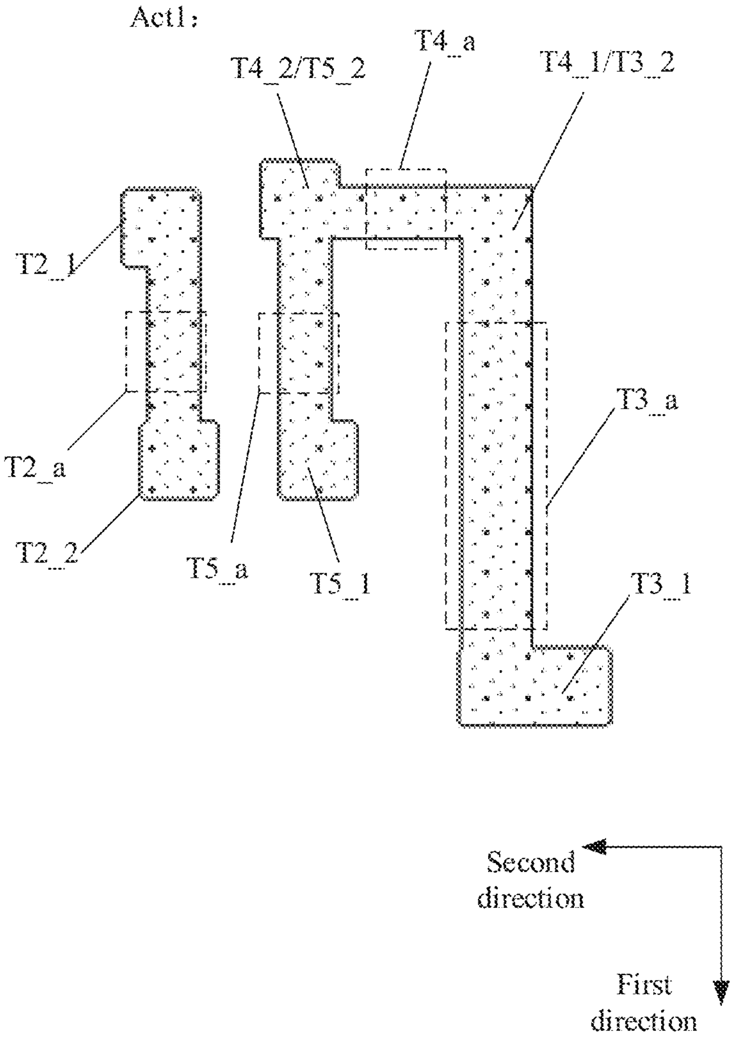
FIG. 7 is a plan view of a first semiconductor layer according to some embodiments of the present disclosure.
Figure 8:
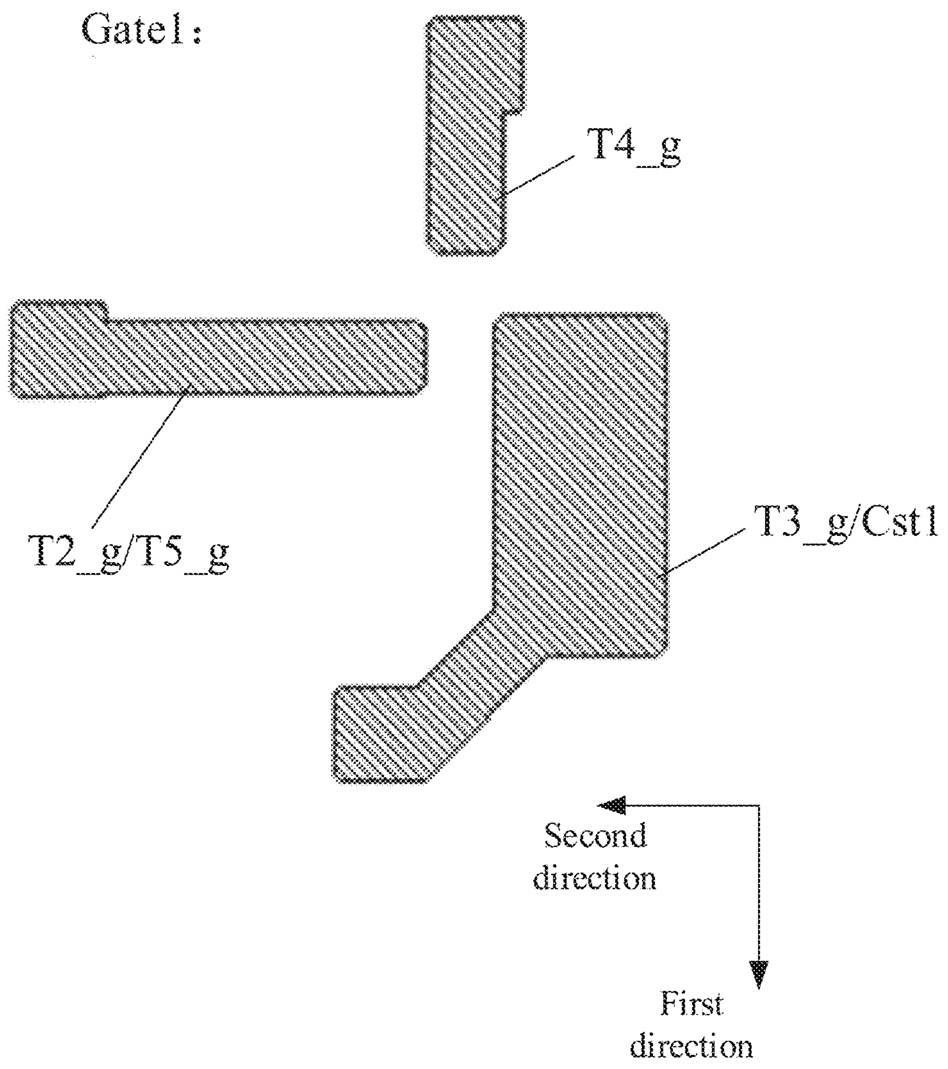
FIG. 8 is a plan view of a first gate metal layer according to some embodiments of the present disclosure.
Figure 9:
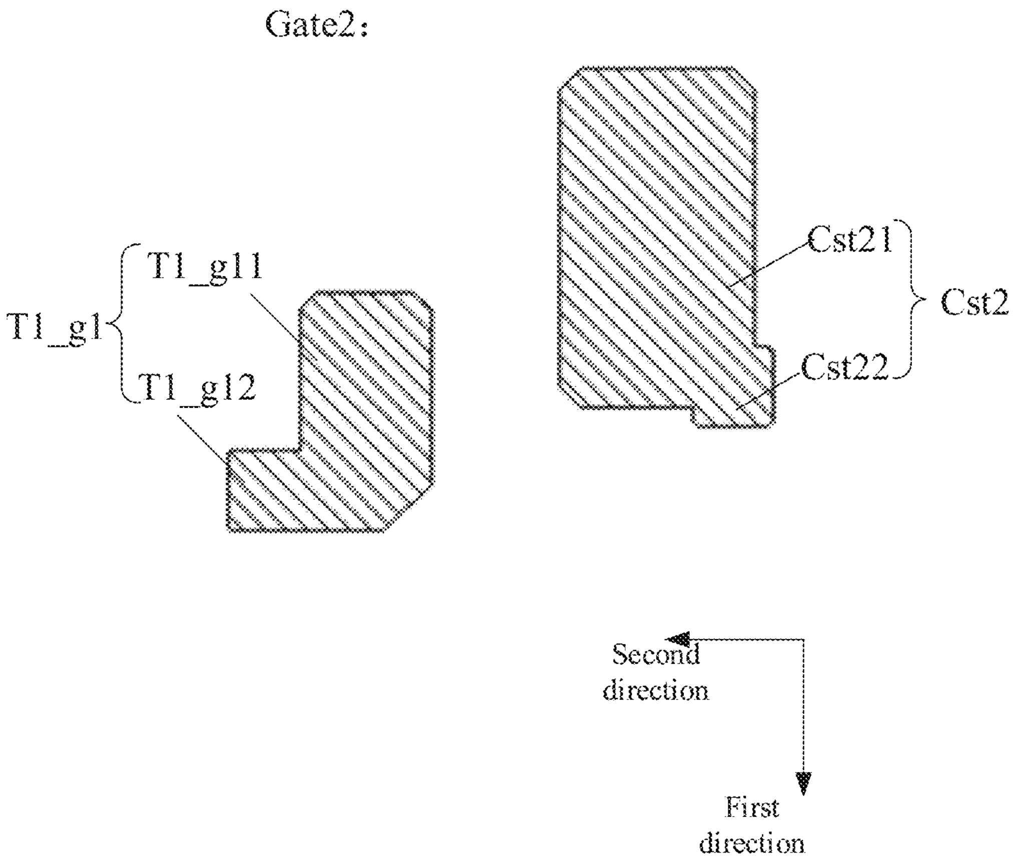
FIG. 9 is a schematic diagram of a second gate metal layer according to some embodiments of the present disclosure.
Figure 10:
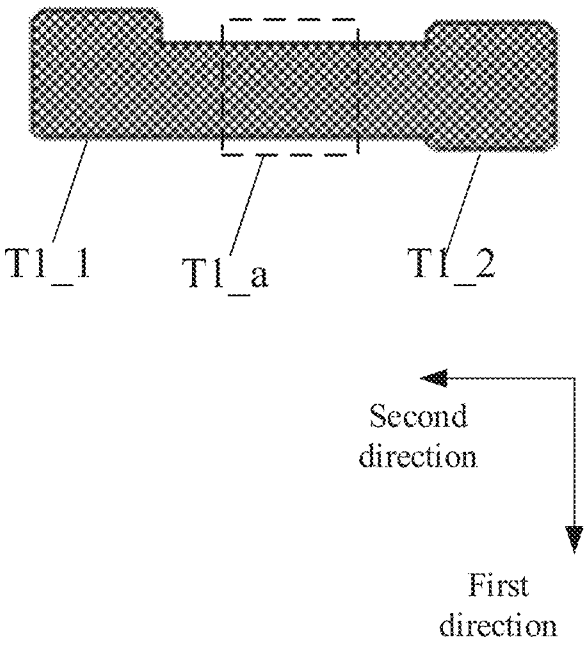
FIG. 10 is a schematic diagram of a second semiconductor layer according to some embodiments of the present disclosure.
Figure 11:
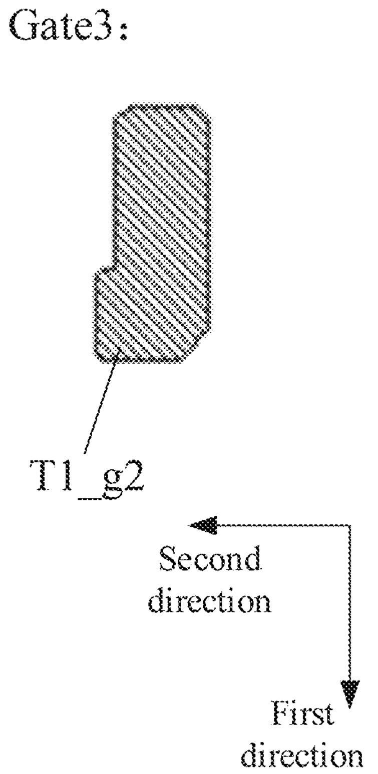
FIG. 11 is a schematic diagram of a third gate metal layer according to some embodiments of the present disclosure.
Figure 12:
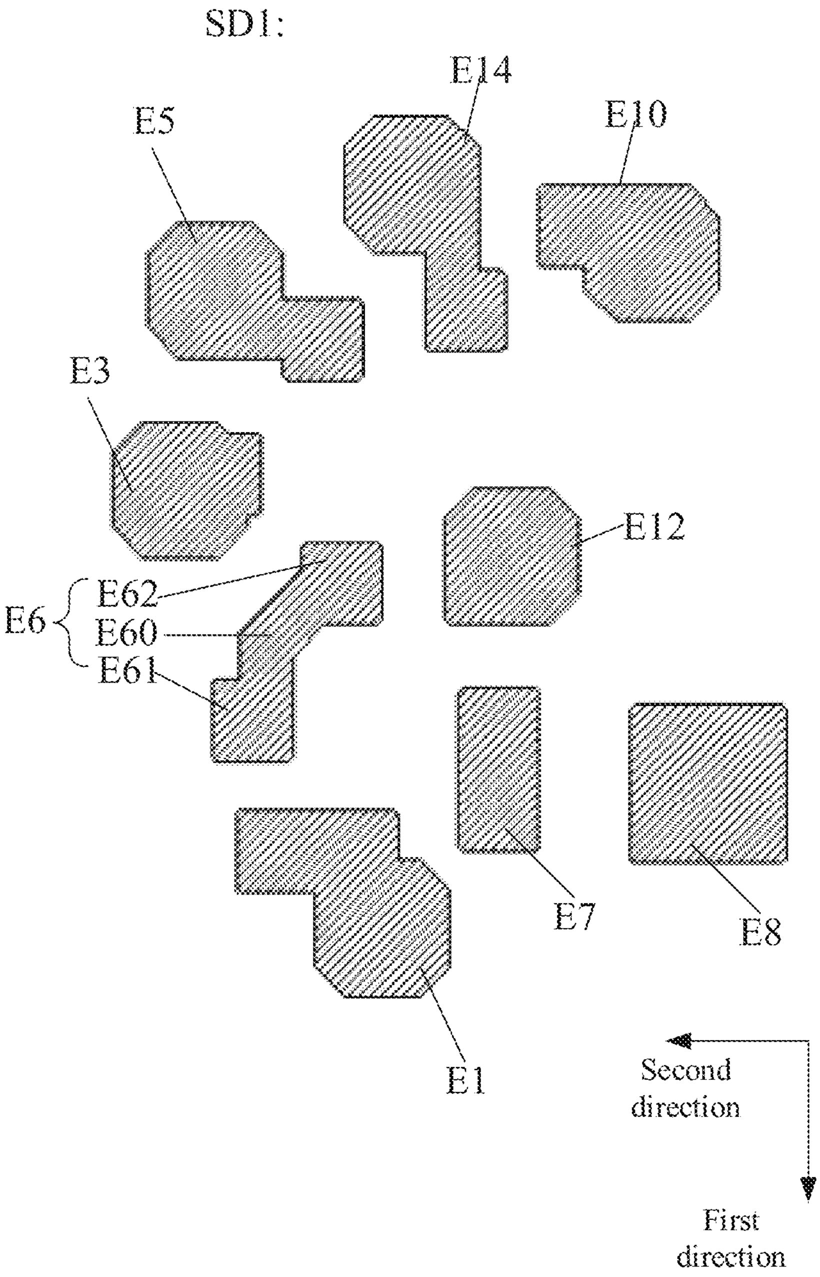
FIG. 12 is a schematic diagram of a first source-drain metal layer according to some embodiments of the present disclosure.
Figure 13:
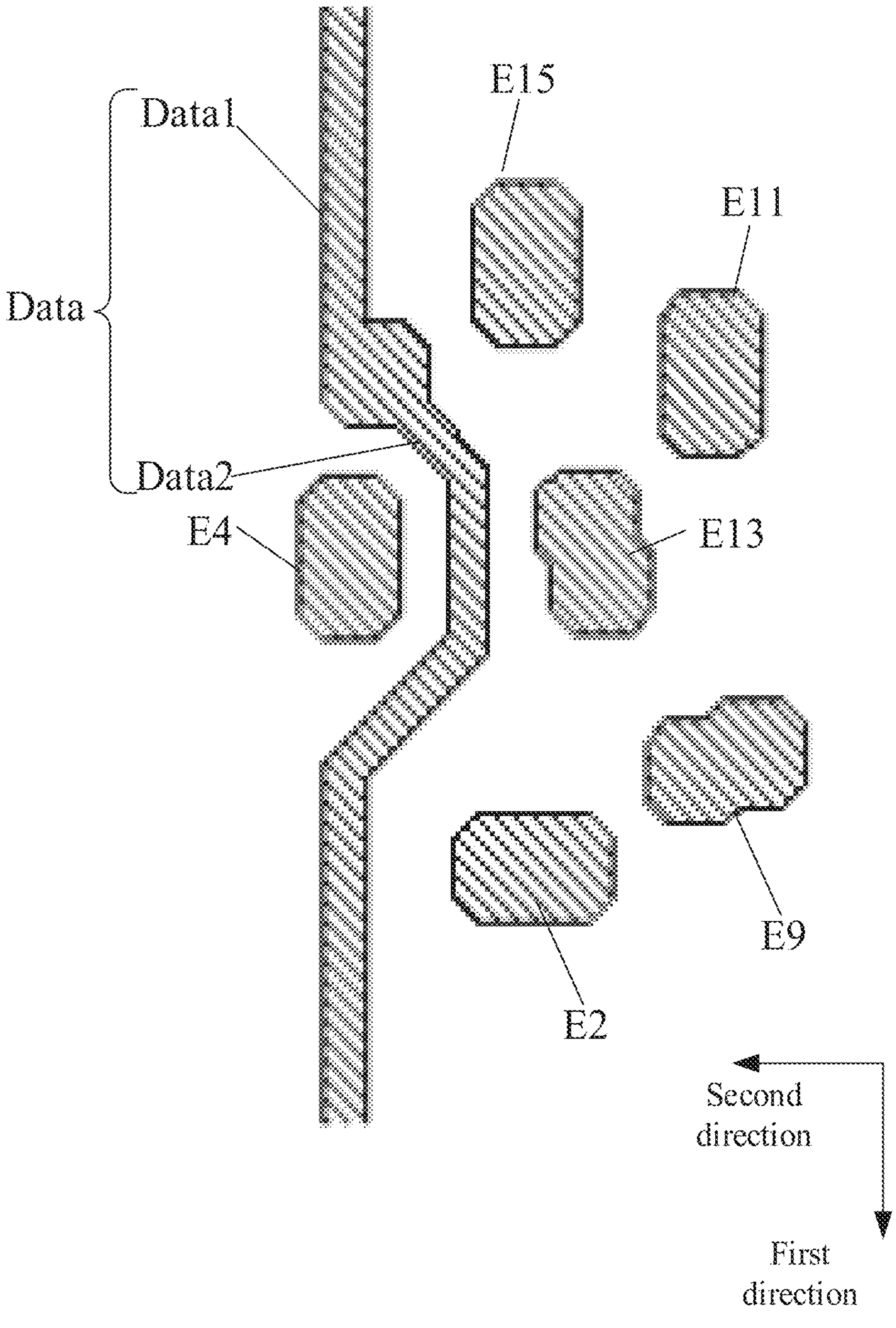
FIG. 13 is a schematic diagram of a second source-drain metal layer according to some embodiments of the present disclosure.
Figure 14:
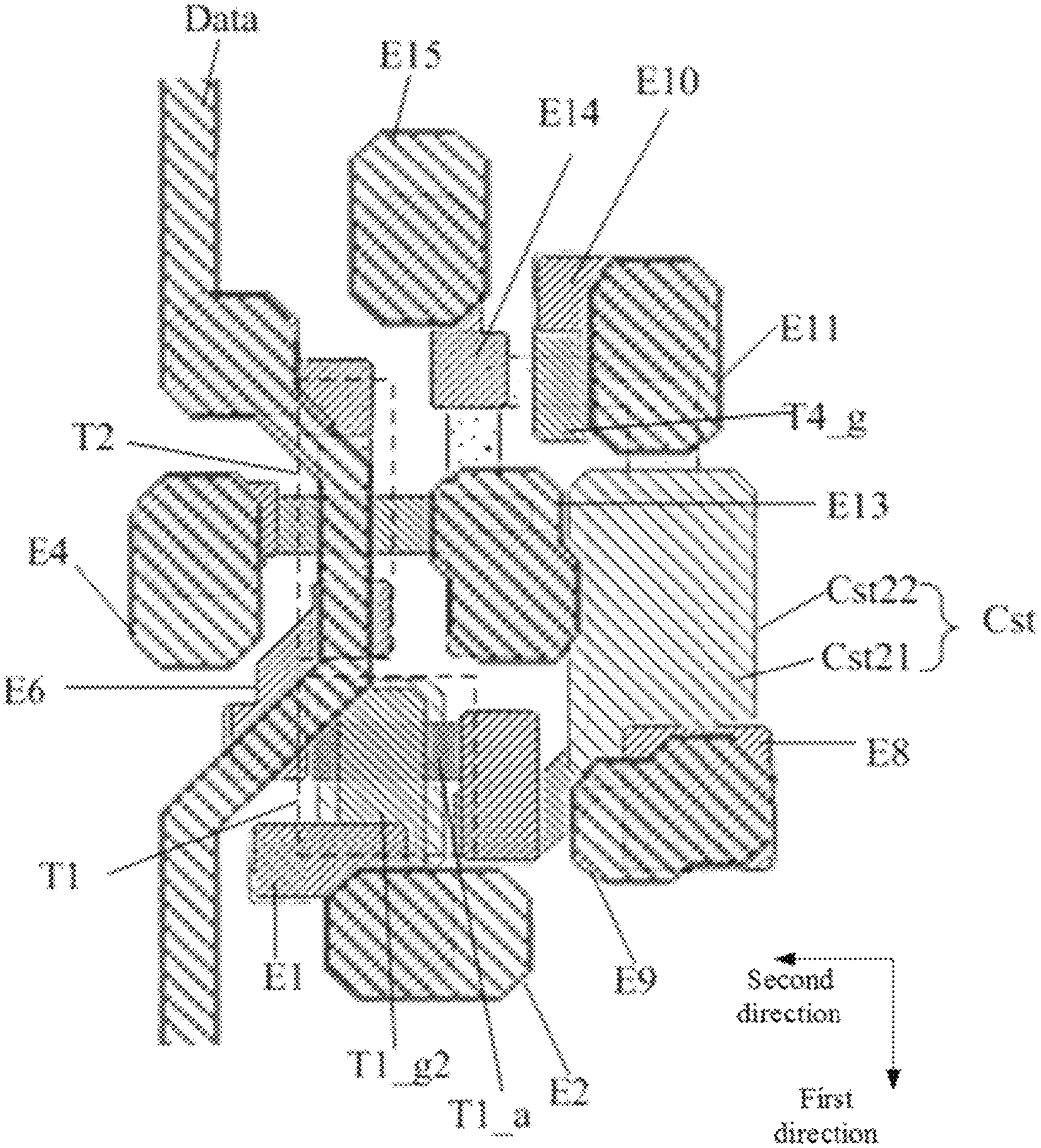
FIG. 14 is a superimposed plan view of a first semiconductor layer, a first gate metal layer, a second gate metal layer, a second semiconductor layer, a third gate metal layer, a first source-drain metal layer, and a second source-drain metal layer according to some embodiments of the present disclosure.
Figure 15:
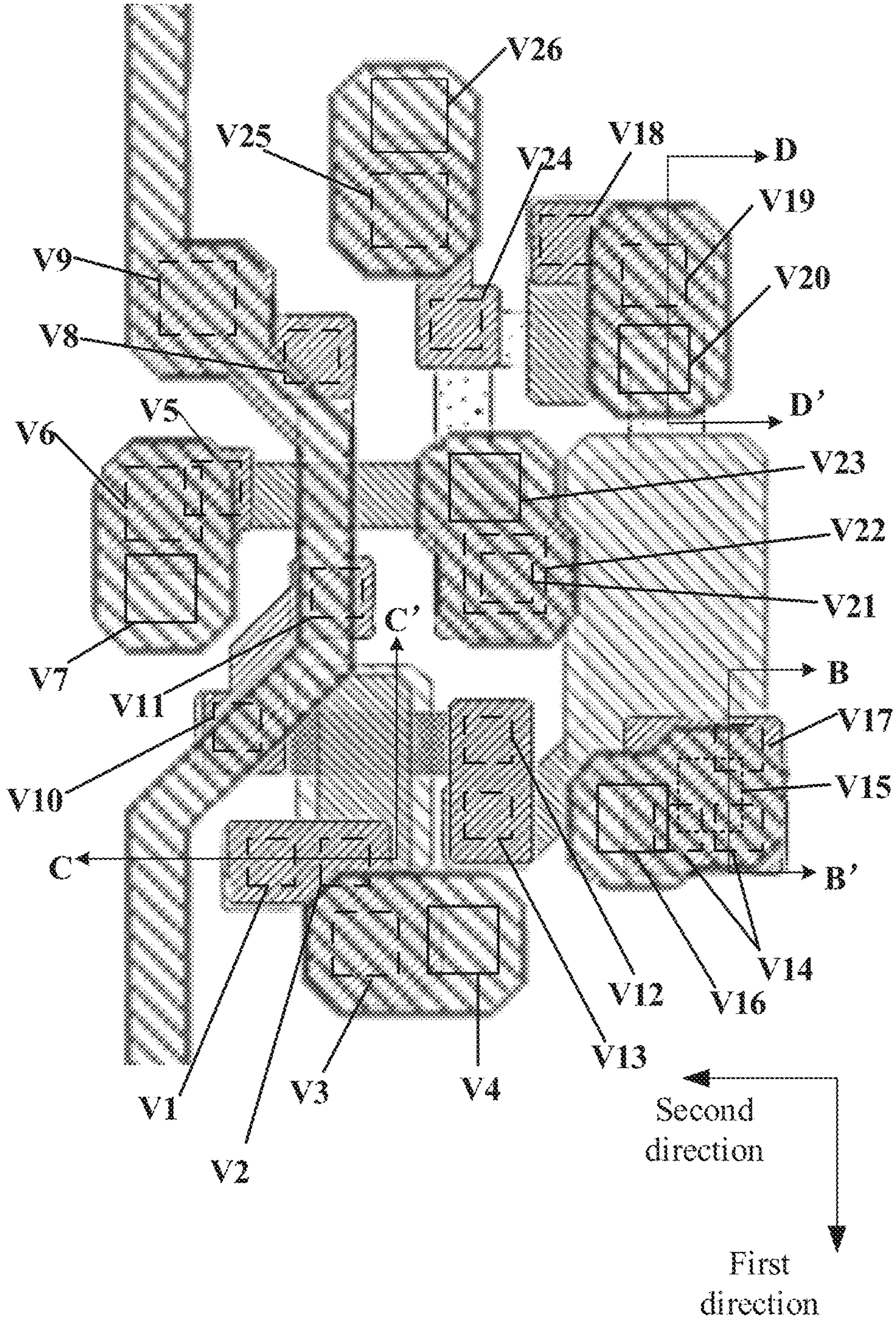
FIG. 15 is a superimposed plan view of vias in a first semiconductor layer, a first gate metal layer, a second gate metal layer, a second semiconductor layer, a third gate metal layer, a first source-drain metal layer, a second source-drain metal layer, and a second planarization layer according to some embodiments of the present disclosure.
Figure 16:
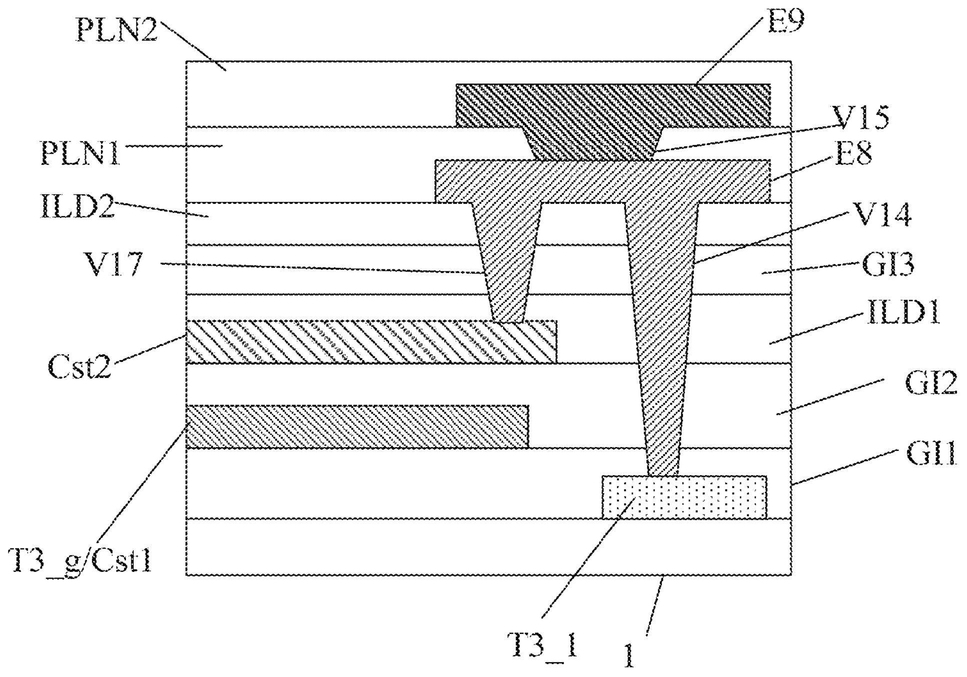
FIG. 16 is a sectional view taken along a line B-B' of FIG. 15.
Figure 17:
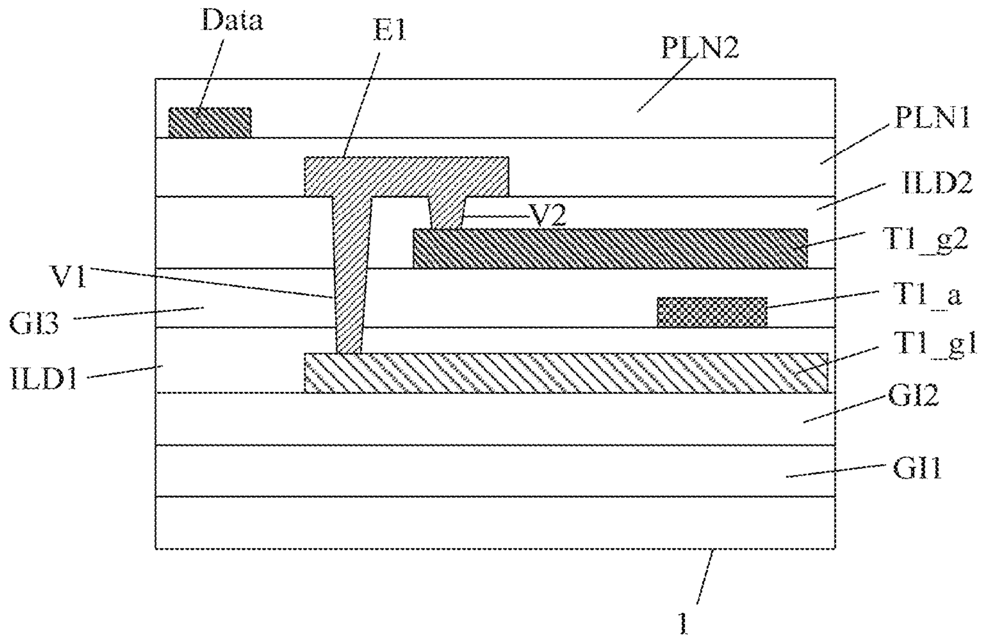
FIG. 17 is a sectional view taken along a line C-C' of FIG. 15.
Figure 18:
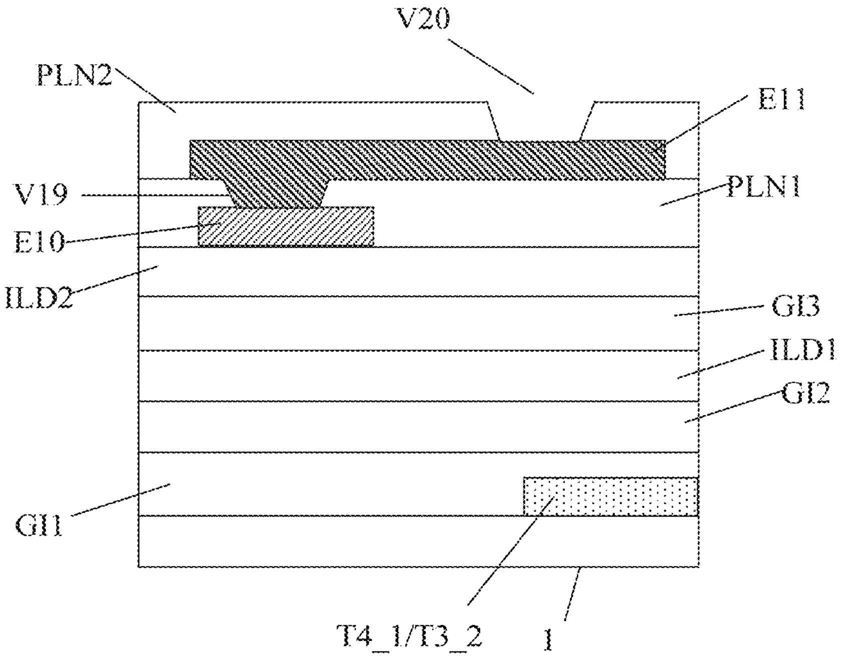
FIG. 18 is a sectional view taken along a line D-D' of FIG. 15.
Figure 19:
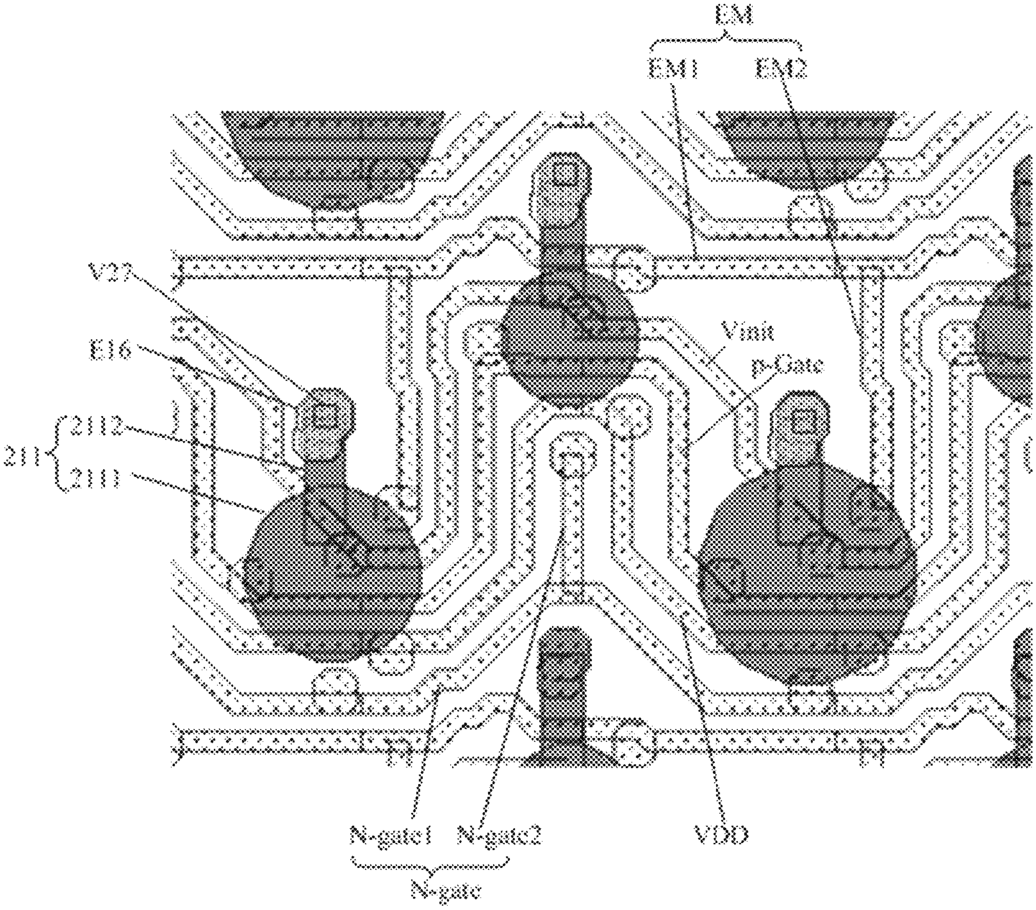
FIG. 19 is a plan view of a transparent wire layer and a first electrode layer according to some embodiments of the present disclosure.
Figure 20:
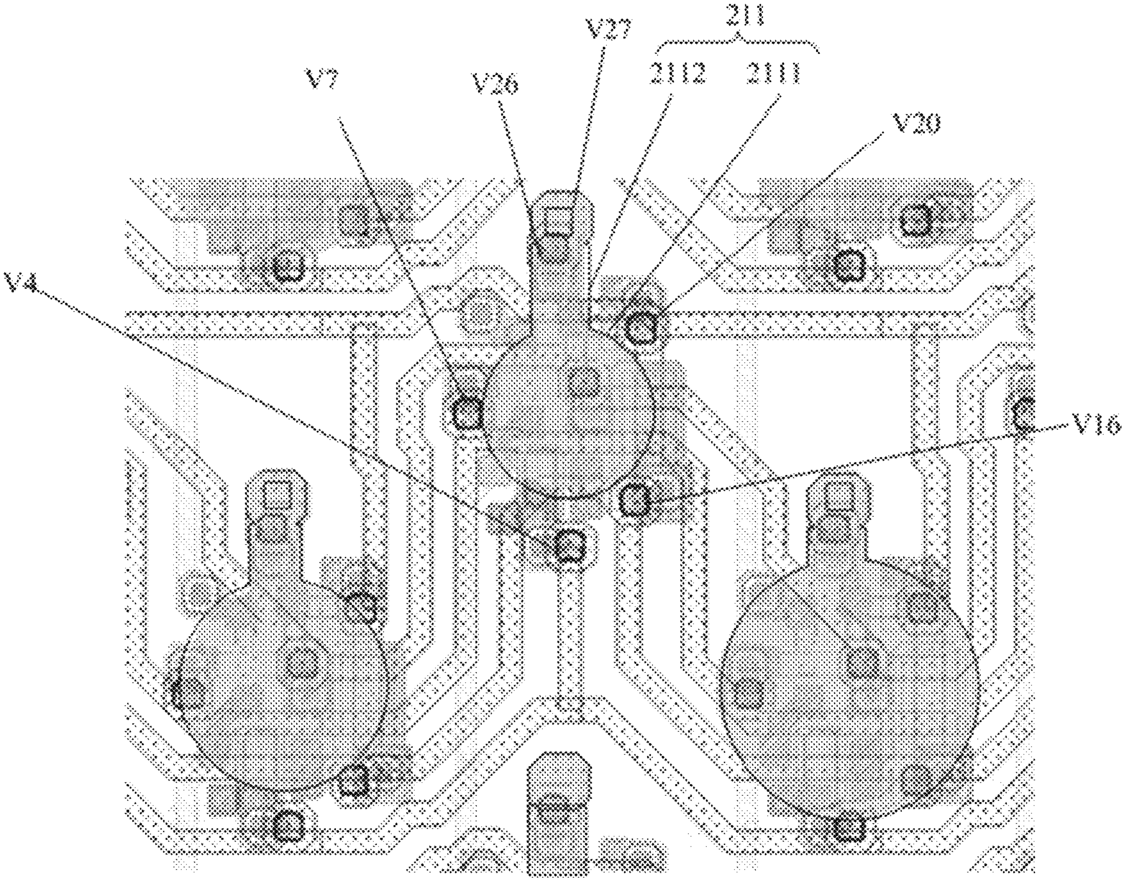
FIG. 20 is a superimposed plan view of a first electrode layer and a plurality of first pixel circuits according to some embodiments of the present disclosure.

FIG. 7 is a plan view of a first semiconductor layer according to some embodiments of the present disclosure. FIG. 8 is a plan view of a first gate metal layer according to some embodiments of the present disclosure. FIG. 9 is a schematic diagram of a second gate metal layer according to some embodiments of the present disclosure. FIG. 10 is a schematic diagram of a second semiconductor layer according to some embodiments of the present disclosure. FIG. 11 is a schematic diagram of a third gate metal layer according to some embodiments of the present disclosure. FIG. 12 is a schematic diagram of a first source-drain metal layer according to some embodiments of the present disclosure. FIG. 13 is a schematic diagram of a second source-drain metal layer according to some embodiments of the present disclosure. FIG. 14 is a superimposed plan view of a first semiconductor layer, a first gate metal layer, a second gate metal layer, a second semiconductor layer, a third gate metal layer, a first source-drain metal layer, and a second source-drain metal layer according to some embodiments of the present disclosure. FIG. 15 is a superimposed plan view of vias in a first semiconductor layer, a first gate metal layer, a second gate metal layer, a second semiconductor layer, a third gate metal layer, a first source-drain metal layer, a second source-drain metal layer, and a second planarization layer according to some embodiments of the present disclosure. FIG. 16 is a sectional view taken along a line B-B' of FIG. 15. FIG. 17 is a sectional view taken along a line C-C' of FIG. 15. FIG. 18 is a sectional view taken along a line D-D' of FIG. 15. FIG. 19 is a plan view of a transparent wire layer and a first electrode layer according to some embodiments of the present disclosure. FIG. 20 is a superimposed plan view of a first electrode layer and a plurality of first pixel circuits according to some embodiments of the present disclosure.

As shown in FIGS. 7 to 18, a first semiconductor layer Act1 may be formed by patterning a semiconductor material, may include active layers and doped region patterns of all P-type transistors (i.e., the second writing transistor T2, the driving transistor T3, the reset transistor T5, and the luminescent control transistor T4) in the first pixel circuit, and the active layer and the doped region patterns of each transistor in the same first pixel circuit have a one-piece structure. For the same P-type transistor, the two sides of the active layer of the P-type transistor are both provided with the doped region patterns, which may be respectively used as a first electrode and a second electrode of the P-type transistor. Active layers T2_*a*, T3_*a* to T5_*a* of the P-type transistors are identified in FIG. 7. It should be noted that, in the embodiment of the present disclosure, a position of the active layer of each transistor represents a position of the transistor.

In some embodiments, an orthographic projection of an active layer T2_*a* of the second writing transistor T2 on the base substrate 1 is located within an orthographic projection of the first electrode 211 of the first light emitting device on the base substrate 1.

As shown in FIG. 7, a first electrode T5_1 and a second electrode T5_2 of the reset transistor T5 are arranged in the first direction, an orthographic projection of the reset transistor T5 on the base substrate 1 is located on a side of an orthographic projection of the storage capacitor Cst on the base substrate 1 in the second direction. The orthographic projection of the reset transistor T5 on the base substrate 1 is located between the orthographic projection of the storage capacitor Cst on the base substrate 1 and an orthographic projection of the second writing transistor T2 on the base substrate 1. The first direction intersects the second direction, for example, the first direction is perpendicular to the second direction. The active layer T2_*a* of the second writing transistor T2 is separated from the active layer T5_*a* of the reset transistor T5. The active layer T5_*a* of the reset transistor T5, an active layer T3_*a* of the driving transistor T3, and an active layer T4_*a* of the luminescent control transistor T4 are formed as a continuous pattern. A first electrode T4_1 and a second electrode T4_2 of the luminescent control transistor T4 are arranged in the second direction, the second electrode T4_2 of the luminescent control transistor T4 and the second electrode T5_2 of the reset transistor T5 have a one-piece structure, and the first electrode T4_1 of the luminescent control transistor T4 and a second electrode T3_2 of the driving transistor T3 have a one-piece structure.

As shown in FIG. 8, a first gate metal layer Gate1 includes: a gate electrode T2_*g* of the second writing transistor T2, a gate electrode T5_*g* of the reset transistor T5, a gate electrode T3_*g* of the driving transistor T3, a gate electrode T4_*g* of the luminescent control transistor T4, and a first plate Cst1 of the storage capacitor Cst. The gate electrode T2_*g* of the second writing transistor T2 and the gate electrode T5_*g* of the reset transistor T5 have a one-piece structure extending in the second direction. The gate electrode T3_*g* of the driving transistor T3 and the first plate Cst1 of the storage capacitor Cst have a one-piece structure.

In some embodiments, the first writing transistor T1 is a double gate transistor, including a first gate electrode T1_*g*1 and a second gate electrode T1_*g* 2. As shown in FIGS. 9 to 11 in combination, a second plate Cst2 of the storage capacitor Cst and the first gate electrode T1_*g*1 of the first writing transistor T1 are located in the second gate metal layer Gate2. The first plate Cst1 and the second plate Cst2 of the storage capacitor Cst are disposed opposite to each other. The second gate electrode T1_*g*2 of the first writing transistor T1 is located in the third gate metal layer Gate3. The first gate electrode T1_*g*1 and the second gate electrode T1_*g*2 are disposed opposite to each other.

As shown in FIG. 9, the second plate Cst2 of the storage capacitor Cst includes: a plate main body Cst21 and a plate connector Cst22, a shape of the plate main body Cst21 is approximately a rectangle, and corners of the rectangle have cut corners. The plate connector Cst22 is used for being connected to the first voltage line VDD. The orthographic projection of the storage capacitor Cst on the base substrate 1 is located on a side of the orthographic projection of the first electrode T4_1 of the luminescent control transistor T4 on the base substrate 1 in the first direction.

In some embodiments, an orthographic projection of the second plate Cst2 on the base substrate 1 at least partially overlaps the orthographic projection of the first electrode 211 of the first light emitting device on the base substrate 1.

As shown in FIG. 9, the first gate electrode T1_g1 of the first writing transistor T1 is formed as a bent structure as a whole. For example, the first gate electrode T1_g1 of the first writing transistor T1 includes: a gate main body T_g11 and a gate connector T1_g12 located on a side of the gate main body T1_g11 in the second direction.

As shown in FIG. 10, the second semiconductor layer Act2 includes an active layer T1_a of the first writing transistor T1, and is made of an oxide semiconductor material including, for example, IGZO. In the same first pixel circuit, the two sides of the active layer T1_a of the first writing transistor T1 are both provided with doped region patterns, which may be respectively used as a first electrode T1_1 and a second electrode T1_2 of the first writing transistor T1. The first electrode T1_1 and the second electrode T1_2 of the first writing transistor T1 may be arranged in the second direction. A dimension of each of the first electrode T1_1 and the second electrode T1_2 of the first writing transistor T1 in the first direction is greater than that of the active layer T1_a in the first direction, so that the first source-drain metal layer SD1 is connected to the first electrode T1_1 and the second electrode T1_2 of the first writing transistor T1 through vias.

In some embodiments, an orthographic projection of the active layer T1_a of the first writing transistor T1 on the base substrate 1 at least partially overlaps the orthographic projection of the first electrode 211 of the first light emitting device on the base substrate 1.

In the embodiment of the present disclosure, the first writing transistor T1 is a double gate transistor, and the first gate electrode T1_g1 and the second gate electrode T1_g2 are respectively located on two sides of the active layer T1_a in a thickness direction thereof, so that drift in characteristics caused by the active layer T1_a being irradiated may be prevented from occurring in the first writing transistor T1.

Positions of the first writing transistor T1 and the second writing transistor T2 are indicated by two dashed boxes in FIG. 14, and as shown in FIGS. 7 to 11 and 14, an orthographic projection of the second writing transistor T2 on the base substrate 1 is located on a side of the storage capacitor Cst in the second direction. In addition, the first writing transistor T1 is located on a side of the second writing transistor T2 in the first direction. The first direction and the second direction intersect with each other, e.g., the first direction is perpendicular to the second direction.

As shown in FIG. 12, the first source-drain metal layer SD1 includes: a first transfer electrode E1, a third transfer electrode E3, a fifth transfer electrode E5, a sixth transfer electrode E6, a seventh transfer electrode E7, an eighth transfer electrode E8, a tenth transfer electrode E10, a twelfth transfer electrode E12, and a fourteenth transfer electrode E14.

An orthographic projection of the first transfer electrode E1 on the base substrate 1 at least partially overlaps an orthographic projection of the first gate electrode T1_g1 of the first writing transistor T1 on the base substrate 1. An orthographic projection of the fourteenth transfer electrode E14 on the base substrate 1 at least partially overlaps an orthographic projection of the second electrode T4_2 of the luminescent control transistor T4 on the base substrate 1. An orthographic projection of the third transfer electrode E3 on the base substrate 1 at least partially overlaps an orthographic projection of the gate electrode T2_g of the second writing transistor T2 on the base substrate 1. An orthographic projection of the fifth transfer electrode E5 on the base substrate 1 at least partially overlaps an orthographic projection of the first electrode T2_1 of the second writing transistor T2 on the base substrate 1.

The sixth transfer electrode E6 includes: a first portion E61, a second portion E62 and a middle portion E60 connected therebetween; an orthographic projection of the second portion E62 of the sixth transfer electrode E6 on the base substrate 1 at least partially overlaps an orthographic projection of the second electrode T2_2 of the second writing transistor T2 on the base substrate 1; an orthographic projection of the first portion E61 of the sixth transfer electrode E6 on the base substrate 1 at least partially overlaps an orthographic projection of the first electrode T1_1 of the first writing transistor T1 on the base substrate 1; and the middle portion E60 of the sixth transfer electrode E6 may be formed to be bent. As shown in FIGS. 12 and 14 to 18, one terminal of the sixth transfer electrode E6 is connected to the first electrode T1_1 of the first writing transistor T1 through a tenth via V10, and the other terminal of the sixth transfer electrode E6 is connected to the second electrode T2_2 of the second writing transistor T2 through an eleventh via V11. The tenth via V10 penetrates through the third gate insulating layer GI3 and the second interlayer dielectric layer ILD2, and the eleventh via V11 penetrates through the first gate insulating layer GI1, the second gate insulating layer GI2, the first interlayer dielectric layer ILD1, the third gate insulating layer GI3 and the second interlayer dielectric layer ILD2.

In some embodiments, an orthographic projection of the sixth transfer electrode E6 on the base substrate 1 at least partially overlaps the orthographic projection of the first electrode 211 of the first light emitting device on the base substrate 1.

An orthographic projection of the seventh transfer electrode E7 on the base substrate 1 at least partially overlaps an orthographic projection of the second electrode T1_2 of the first writing transistor T1 on the base substrate 1 and an orthographic projection of the gate electrode T3_g of the driving transistor T3 on the base substrate 1. One terminal of the seventh transfer electrode E7 is connected to the second electrode T1_2 of the first writing transistor T1 through a twelfth via V12, and the other terminal of the seventh transfer electrode E7 is connected to the gate electrode T3_g of the driving transistor T3 through a thirteenth via V13. The twelfth via penetrates through the third gate insulating layer GI3 and the second interlayer dielectric layer ILD2, and the thirteenth via penetrates through the second gate insulating layer GI2, the first interlayer dielectric layer ILD1, the third gate insulating layer GI3 and the second interlayer dielectric layer ILD2.

In some embodiments, an orthographic projection of the seventh transfer electrode E7 on the base substrate 1 at least partially overlaps an orthographic projection of the first electrode 211 of the first light emitting device on the base substrate 1.

An orthographic projection of the eighth transfer electrode E8 on the base substrate 1 at least partially overlaps an orthographic projection of the second plate Cst2 of the storage capacitor Cst on the base substrate 1, and an orthographic projection of the first electrode T3_1 of the driving transistor T3 on the base substrate 1. An orthographic projection of the tenth transfer electrode E10 on the base substrate 1 at least partially overlaps an orthographic projection of the gate electrode T4_g of the luminescent control transistor T4 on the base substrate 1. An orthographic projection of the twelfth transfer electrode E12 on the base substrate 1 at least partially overlaps an orthographic projection of the reset transistor T5_1 on the base substrate 1. An orthographic projection of the fourteenth transfer electrode on the base substrate 1 at least partially overlaps an orthographic projection of the second electrode T5_2 of the reset transistor T5 on the base substrate 1.

As shown in FIG. 13, the second source-drain metal layer SD2 includes: a data line Data, a second transfer electrode E2, a fourth transfer electrode E4, a ninth transfer electrode E9, an eleventh transfer electrode E11, a thirteenth transfer electrode E13, and a fifteenth transfer electrode E15. As shown in FIG. 13, the data line Data includes a data line main body Data1 and a curved portion Data2; the data line main body Data1 and the curved portion Data2 have a one-piece structure; the data line main body Data1 extends along the first direction; an orthographic projection of the curved portion Data2 on the base substrate 1 is located on a side of the orthographic projection of the storage capacitor Cst on the base substrate 1 along the second direction; and is curved towards the orthographic projection of the storage capacitor Cst on the base substrate 1, and the orthographic projection of the curved portion Data2 on the base substrate 1 at least partially overlaps the orthographic projection of the gate electrode T2_g of the second writing transistor T2 on the base substrate 1. In some embodiments, the orthographic projection of the curved portion Data2 on the base substrate 1 at least partially overlaps the orthographic projection of the first electrode 211 of the first light emitting device on the base substrate 1.

In some embodiments, as shown in FIGS. 7 to 18, the data line Data is connected to the fifth transfer electrode E5 through a ninth via V9 penetrating through the first planarization layer PLN1, the fifth transfer electrode E5 is connected to the first electrode T2_1 of the second writing transistor T2 through an eighth via V8, and the eighth via V8 penetrates through the first gate insulating layer GI1, the second gate insulating layer GI2, the first interlayer dielectric layer ILD1, the third gate insulating layer GI3 and the second interlayer dielectric layer ILD2.

The fourth transfer electrode E4 is located on a side of the curved portion Data2 away from the storage capacitor Cst, and an orthographic projection of the fourth transfer electrode E4 on the base substrate 1 at least partially overlaps the orthographic projection of the third transfer electrode E3 on the base substrate 1. When the second scan line P-Gate is connected to the gate electrode T2_g of the second writing transistor T2, the second scan line P-Gate may be connected to the gate electrode T2_g of the second writing transistor T2 through the third transfer electrode E3 and the fourth transfer electrode E4.

The thirteenth transfer electrode E13 is located on a side of the curved portion Data2 close to the storage capacitor Cst; and an orthographic projection of the thirteenth transfer electrode E13 on the base substrate 1 at least partially overlaps an orthographic projection of the twelfth transfer electrode E12 on the base substrate 1. The initialization voltage line Vinit may be connected to the first electrode T5_1 of the reset transistor T5 through the thirteenth transfer electrode E13 and the twelfth transfer electrode E12. The second transfer electrode E2 is located on a side of the fifteenth transfer electrode E15 in the first direction, and an orthographic projection of the second transfer electrode E2 on the base substrate 1 at least partially overlaps the orthographic projection of the first transfer electrode E1 on the base substrate 1. The first scan line N-Gate may be connected to the first gate electrode T1_g1 and the second gate electrode T1_g2 of the first writing transistor T1 through the second transfer electrode E2 and the first transfer electrode E1. The ninth transfer electrode E9 is located on a side of the eleventh transfer electrode E11 in the first direction. An orthographic projection of the ninth transfer electrode E9 on the base substrate 1 at least partially overlaps the orthographic projection of the eighth transfer electrode E8 on the base substrate 1. An orthographic projection of the eleventh transfer electrode E11 on the base substrate 1 at least partially overlaps the orthographic projection of the tenth transfer electrode E10 on the base substrate 1. An orthographic projection of the fifteenth transfer electrode E15 on the base substrate 1 at least partially overlaps an orthographic projection of the fourteenth transfer electrode E14 on the base substrate 1.

As shown in FIG. 19, the transparent wire layer includes: the first scan line N-Gate, the second scan line P-Gate, the luminescent control line EM, the first voltage line VDD, the initialization voltage line Vinit, and a sixteenth transfer electrode E16. Each signal line in the transparent wire layer may be made of a transparent conductive material, such as, indium tin oxide (ITO) or the like.

As shown in FIGS. 7 to 19, the first scan line N-Gate is connected to the gate electrode T1_g of the first writing transistor T1 through the first transfer electrode E1 and the second transfer electrode E2. Specifically, one terminal of the first transfer electrode E1 is connected to the first gate electrode T1_g1 of the first writing transistor T1 through a first via V1, the other terminal of the first transfer electrode E1 is connected to the second gate electrode T1_g2 of the first writing transistor T1 through a second via V2; the first via V1 penetrates through the first interlayer dielectric layer ILD1, the third gate insulating layer GI3 and the second interlayer dielectric layer ILD2, and the second via V2 penetrates through the second interlayer dielectric layer ILD2. One terminal of the second transfer electrode E2 is connected to the first transfer electrode E1 through a third via V3 penetrating through the first planarization layer PLN1, and the first scan line N-Gate is connected to the other terminal of the second transfer electrode E2 through a fourth via V4 penetrating through the second planarization layer PLN2.

The second scan line P-Gate is connected to the gate electrode T2_g of the second writing transistor T2 through the third transfer electrode E3 and the fourth transfer electrode E4. Specifically, the third transfer electrode E3 is connected to the gate electrode T2_g of the second writing transistor T2 through a fifth via V5, and the fifth via V5 penetrates through the second gate insulating layer GI2, the first interlayer dielectric layer ILD1, the third gate insulating layer GI3 and the second interlayer dielectric layer ILD2. The fourth transfer electrode E4 is connected to the third transfer electrode E3 through a sixth via V6 penetrating through the first planarization layer PLN1, and the second scan line P-Gate is connected to the fourth transfer electrode E4 through a seventh via V7 penetrating through the second planarization layer PLN2.

The first voltage line VDD is connected to the first electrode T3_I of the driving transistor T3 through the eighth transfer electrode E8 and the ninth transfer electrode E9. Specifically, the eighth transfer electrode E8 is connected to the first electrode T3_1 of the driving transistor T3 through a fourteenth via V14, and the fourteenth via V14 penetrates through the first gate insulating layer Gil, the second gate insulating layer GI2, the first interlayer dielectric layer ILD1, the third gate insulating layer GI3 and the second interlayer dielectric layer ILD2. The ninth transfer electrode E9 is connected to the eighth transfer electrode E8 through a fifteenth via V15 penetrating through the first planarization layer PLN1. The first voltage line VDD is connected to the ninth transfer electrode E9 through a sixteenth via penetrating through the second planarization layer PLN2.

In addition, the eighth transfer electrode E8 is further connected to the second plate Cst2 of the storage capacitor Cst through a seventeenth via V17, so that the second plate Cst2 of the storage capacitor Cst is electrically connected to the first voltage line. The seventeenth via penetrates through the first interlayer dielectric layer ILD1, the third gate insulating layer GI3 and the second interlayer dielectric layer ILD2.

The luminescent control line EM is connected to the gate electrode T4_g of the luminescent control transistor T4 through the tenth transfer electrode E10 and the eleventh transfer electrode E11. Specifically, the tenth transfer electrode E10 is connected to the gate electrode T4_g of the luminescent control transistor T4 through an eighteenth via V18, and the eighteenth via V18 penetrates through the second gate insulating layer GI2, the first interlayer dielectric layer ILD1, the third gate insulating layer GI3 and the second interlayer dielectric layer ILD2; the eleventh transfer electrode E11 is connected to the tenth transfer electrode E10 through a nineteenth via penetrating through the first planarization layer PLN1; the luminescent control line EM is connected to the eleventh transfer electrode E11 through a twentieth via V20 penetrating through the second planarization layer PLN2.

The initialization voltage line Vinit is connected to the first electrode T5_1 of the reset transistor T5 through the twelfth transfer electrode E12 and the thirteenth transfer electrode E13. Specifically, the twelfth transfer electrode E12 is connected to the first electrode T5_1 of the reset transistor T5 through a twenty-first via V21, and the twenty-first via V21 penetrates through the first gate insulating layer GI1, the second gate insulating layer GI2, the first interlayer dielectric layer ILD1, the third gate insulating layer GI3 and the second interlayer dielectric layer ILD2. The thirteenth transfer electrode E13 is connected to the twelfth transfer electrode E12 through a twenty-second via V22, and the twenty-second via V22 penetrates through the first planarization layer PLN1 between the first source-drain metal layer SD1 and the second source-drain metal layer SD2. The initialization voltage line Vinit is connected to the thirteenth transfer electrode E13 through a twenty-third via V23, and the twenty-third via V23 penetrates through the second planarization layer PLN2 between the transparent wire layer and the second source-drain metal layer.

As shown in FIGS. 14 to 15 and 19 to 20, the first electrode 211 of the first light emitting device includes an electrode main body 2111 and an electrode connector 2112 connected to the electrode main body 2111. Optionally, the electrode main body 2111 is substantially circular. The electrode connector 2112 is connected to the second electrode T5_2 of the reset transistor T5 through the fourteenth transfer electrode E14 and the fifteenth transfer electrode E15. Specifically, the fourteenth transfer electrode E14 is connected to the second electrode T5_2 of the reset transistor T5 through a twenty-fourth via V24, the fifteenth transfer electrode E15 is connected to the fourteenth transfer electrode E14 through a twenty-fifth via V25, the sixteenth transfer electrode E16 is connected to the fifteenth transfer electrode E15 through a twenty-sixth via V26 penetrating through the second planarization layer PLN2, and the electrode connector 2112 is connected to the sixteenth transfer electrode E16 through a twenty-seventh via V27 penetrating through the third planarization layer. The twenty-fourth via V24 penetrates through the first gate insulating layer GI1, the second gate insulating layer GI2, the first interlayer dielectric layer ILD1, the third gate insulating layer GI3 and the second interlayer dielectric layer ILD2; the twenty-fifth via V25 penetrates through the first planarization layer PLN1 between the first source-drain metal layer SD1 and the second source-drain metal layer SD2.

Figure 21:
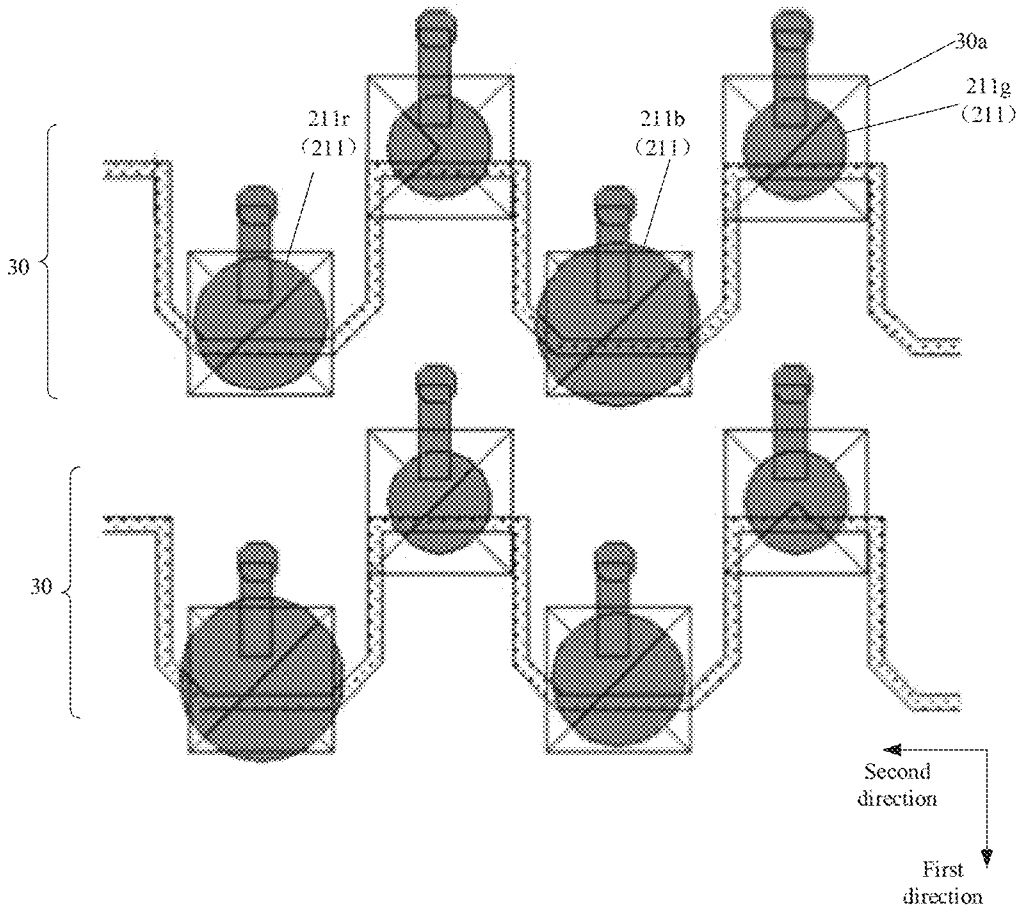
FIG. 21 is a schematic diagram illustrating a layout of a plurality of sub-pixels in a first display region according to some embodiments of the present disclosure.

FIG. 21 is a schematic diagram illustrating a layout of a plurality of sub-pixels in a first display region according to some embodiments of the present disclosure. Each sub-pixel in the first display region includes: a first pixel circuit and a first light emitting device. The plurality of sub-pixels are arranged in a plurality of rows and a plurality of columns. Sub-pixels in the same column are arranged along a first direction. Sub-pixels in the same row are arranged along a second direction. Every two adjacent rows of sub-pixels form a repeating group 30, and the two rows of sub-pixels in the repeating group 30 are arranged in a staggered mode. A rectangular block 30*a* in FIG. 21 represents a region where the first pixel circuit is located. In one example, in the same repeating group 30, one row of sub-pixels is sub-pixels of a first color, and the sub-pixels in the other row include sub-pixels of a second color and sub-pixels of a third color arranged alternately. A color of a sub-pixel is a color of light emitted by a first light emitting device in the sub-pixel. A first electrode of a first light emitting device in the sub-pixel of the first color is denoted as 211*r*, a first electrode of a first light emitting device in the sub-pixel of the second color is denoted as 211*b*, and a first electrode of a first light emitting device in the sub-pixel of the third color is denoted as 211*g*. An area of the first electrode 211*g* is smaller than that of the first electrode 211*r*, and the area of the first electrode 211*r* is smaller than that of the first electrode 211*b*. For example, the sub-pixel of the first color is a green sub-pixel, the sub-pixel of the second color is a red sub-pixel, and the sub-pixel of the third color is a blue sub-pixel.

In some embodiments, an orthographic projection of the first electrode 211*r* on the base substrate 1 covers the orthographic projection of the second writing transistor T2 on the base substrate 1, an orthographic projection of at least a part of the first writing transistor T1 on the base substrate 1, the orthographic projection of the reset transistor T5 on the base substrate 1, an orthographic projection of at least a part of the luminescent control transistor T4 on the base substrate 1, and an orthographic projection of at least a part of the driving transistor T3 on the base substrate 1, and an orthographic projection of at least a part of the storage capacitor Cst on the base substrate 1. An orthographic projection of the first electrode 211*b* on the base substrate 1 covers the orthographic projection of the second writing transistor T2 on the base substrate 1, an orthographic projection of most of the first writing transistor T1 on the base substrate 1, the orthographic projection of the reset transistor T5 on the base substrate 1, an orthographic projection of most of the luminescent control transistor T4 on the base substrate 1, and further covers an orthographic projection of most of the driving transistor T3 on the base substrate 1 and an orthographic projection of most of the storage capacitor Cst on the base substrate 1. An orthographic projection of the first electrode 211*g* on the base substrate 1 covers the orthographic projection of the second writing transistor T2 on the base substrate 1, an orthographic projection of at least a part of the first writing transistor T1 on the base substrate 1, the orthographic projection of the reset transistor T5 on the base substrate 1, an orthographic projection of at least a part of the luminescent control transistor T4 on the base substrate 1, and further covers an orthographic projection of at least a part of the driving transistor T3 on the base substrate 1 and an orthographic projection of at least a part of the storage capacitor Cst on the base substrate 1.

As shown in FIGS. 19 and 21, each luminescent control line EM corresponds to one of the repeating groups 30, different luminescent control lines EM correspond to different repeating groups 30, and each luminescent control line EM is connected to the first pixel circuits of sub-pixels in the corresponding repeating group 30. In some embodiments, the luminescent control line EM includes: a control line main body EM1 and a control line lead-out portion EM2; the control line main body EM1 extends substantially in the second direction, the control line lead-out portion EM2 extends in the first direction. In the same repeating group 30, the first pixel circuits in one row of sub-pixels is connected to the control line main body EM1, and the first pixel circuits in the other row of sub-pixels is connected to the control line lead-out portion EM2.

Each first scan line N-Gate corresponds to one repeating group 30, different first scan lines N-Gate correspond to different repeating groups 30, and each first scan line N-Gate is connected to the first pixel circuits of sub-pixels in the corresponding repeating group 30. In some embodiments, the first scan line N-Gate includes: a scan line main body N-Gate1 and a scan line lead-out portion N-Gate2; the scan line main body N-Gate1 includes: a plurality of scan line segments sequentially arranged in the second direction, the plurality of scan line segments are sequentially connected together to form a bending structure of the scan line main body N-Gate1; the scan line lead-out portion N-Gate2 extends in the first direction. In the same repeating group 30, the first pixel circuits in one row of sub-pixels is connected to the scan line main portion N-Gate1, and the first pixel circuits in the other row of sub-pixels is connected to the scan line lead-out portion N-Gate2.

Each second scan line P-Gate corresponds to one repeating group 30, different second scan lines P-Gate correspond to different repeating groups 30, and each second scan line P-Gate is curved and connected to the first pixel circuits of sub-pixels in the corresponding repeating group 30.

Each initialization voltage line Vinit corresponds to one repeating group 30, different initialization voltage lines Vinit correspond to different repeating groups 30, and each initialization voltage line Vinit is curved and connected to the first pixel circuits of sub-pixels in the corresponding repeating group 30.

Each data line Data corresponds to a column of sub-pixels, different data lines Data correspond to different columns of sub-pixels, and each data line Data is connected to the first pixel circuits in sub-pixels of the corresponding column.

As described above, the second pixel circuit is disposed in the second display region of the display substrate, and is connected to the first initialization voltage line Vinit1', the second initialization voltage line Vinit2', the first voltage line VDD', the first scan line N-Gate', the second scan line P-Gate', and the luminescent control line EM'. In this case, each of the initialization voltage lines Vinit in the first display region may be connected to a corresponding one of the first initialization voltage lines Vinit1' in the second display region, each of the first scan lines N-Gate in the first display region AA1 may be connected to a corresponding one of the first scan lines N-Gate' in the second display region AA2, each of the second scan lines P-Gate in the first display region AA1 may be connected to a corresponding one of the second scan lines P-Gate' in the second display region AA2, and each of the luminescent control lines EM in the first display region AA1 may be connected to a corresponding one of the luminescent control lines EM' in the second display region AA2.

In this case, the first pixel circuit and the second pixel circuit may be driven by a same driver chip to operate simultaneously. When the display substrate is used for the high frequency display, the operation timing of the first pixel circuit in the first display region AA1 is as shown in FIG. 6A, and the operation timing of the second pixel circuit in the second display region AA2 is as shown in FIG. 4. That is, when the second pixel circuit is in the data writing stage t1', the first pixel circuit is in the writing and resetting stage t1; and when the second pixel circuit is in the luminescent stage t2', the first pixel circuit is in the luminescent stage t2. When the display substrate is used for the low frequency display, the operation timing of the first pixel circuit in the first display region AA1 is as shown in FIG. 6B, and the operation timing of the second pixel circuit in the second display region AA2 further includes the anode resetting stage t3', compared with that of FIG. 4. In the anode resetting stage t3' of the second pixel circuit, the luminescent control line EM' to which the second pixel circuit is connected and the luminescent control line EM to which the first pixel circuit is connected supply the same signal; the first scan line N-Gate' to which the second pixel circuit is connected and the first scan line N-Gate to which the first pixel circuit is connected supply the same signal; the second scan line P-Gate' to which the second pixel circuit is connected and the second scan line P-Gate to which the first pixel circuit is connected supply the same signal; and the first reset line Re1 and the second reset line Re2 to which the second pixel circuit is connected both supply a low level signal.

In addition, in the embodiment of the present disclosure, the low temperature polysilicon transistors in the first display region AA1 may be formed in synchronization with the low temperature polysilicon transistors in the second display region AA2, and the oxide transistors in the first display region AA1 may be formed in synchronization with the oxide transistors in the second display region AA2.

The present disclosure also provides a display apparatus. The display apparatus may include the display substrate as described above. The display apparatus may include any device or product having a display function. For example, the display apparatus may be a smart phone, a mobile phone, an e-book reader, a desktop computer (PC), a laptop PC, a netbook PC, a personal digital assistant (PDA), a portable multimedia player (PMP), a digital audio player, a mobile medical equipment, a camera, a wearable device (e.g., a head-mounted device, an electronic apparel, an electronic bracelet, an electronic necklace, an electronic accessory, an electronic tattoo, or a smart watch), a television, and so forth.

As shown in FIGS. 1 and 2, the display apparatus further includes an image sensor 2 located on a side of the display substrate 100, and an orthographic projection of the image sensor on the display substrate 100 falls within the first display region AA1.

It should be understood that, the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display substrate, comprising:

a base substrate, comprising a first display region and a second display region on at least one side of the first display region, wherein a light transmittance of the first display region is greater than that of the second display region; and a plurality of first sub-pixels on the base substrate and in the first display region, wherein at least one of the plurality of first sub-pixels comprises: a first pixel circuit and a first light emitting device, and the first pixel circuit comprises: a storage capacitor and a driving transistor; a first electrode of the driving transistor is connected to a first voltage line; and two plates of the storage capacitor are connected to a gate electrode and the first electrode of the driving transistor, respectively;

the first pixel circuit further comprises:

a data writing sub-circuit configured to write a data voltage signal to the gate electrode of the driving transistor in response to a first scan signal and a second scan signal;

a reset sub-circuit configured to provide an initialization voltage signal to a first electrode of the first light emitting device in response to the second scan signal; and a luminescent control sub-circuit configured to transmit a driving current output from the driving transistor to the first light emitting device in response to a luminescent control signal; and wherein an orthographic projection of the first electrode of the first light emitting device on the base substrate covers at least a part of an orthographic projection of the first pixel circuit on the base substrate; and wherein the data writing sub-circuit comprises:

a first writing transistor, wherein a gate electrode of the first writing transistor is connected to a first scan line for providing the first scan signal, a second electrode of the first writing transistor is connected to the gate electrode of the driving transistor, and the first writing transistor is an oxide transistor; and a second writing transistor, wherein a gate electrode of the second writing transistor is connected to a second scan line for providing the second scan signal, a first electrode of the second writing transistor is connected to a data line for providing the data voltage signal, a second electrode of the second writing transistor is connected to a first electrode of the first writing transistor, and the second writing transistor is a polysilicon transistor.

2. The display substrate of claim 1, wherein the first and second electrodes of the second writing transistor are arranged in a first direction, an orthographic projection of the second writing transistor on the base substrate is on a side of the storage capacitor in a second direction, the first writing transistor is on a side of the second writing transistor in the first direction, and the first and second directions intersect with each other.

3. The display substrate of claim 1, wherein the data line comprises: a data line main body and a curved portion, the data line main body extends in a first direction, an orthographic projection of the curved portion on the base substrate is on a side of an orthographic projection of the storage capacitor on the base substrate in a second direction, and is curved toward the orthographic projection of the storage capacitor on the base substrate, the orthographic projection of the curved portion on the base substrate at least partially overlaps an orthographic projection of the gate electrode of the second writing transistor on the base substrate, and the first and second directions intersect with each other;

wherein the orthographic projection of the curved portion on the base substrate at least partially overlaps the orthographic projection of the first electrode of the first light emitting device on the base substrate.

4. The display substrate of claim 1, wherein the gate electrode of the first writing transistor comprises a first gate electrode and a second gate electrode electrically connected to each other, an orthographic projection of the first gate electrode on the base substrate overlaps an orthographic projection of the second gate electrode on the base substrate; and the first pixel circuit further comprises:

a first transfer electrode, wherein one terminal of the first transfer electrode is connected to the first gate electrode of the first writing transistor through a via, and the other terminal of the first transfer electrode is connected to the second gate electrode of the first writing transistor through a via; and a second transfer electrode connected to the first transfer electrode through a via, and connected to the first scan line through a via, wherein the first pixel circuit further comprises:

a third transfer electrode connected to the gate electrode of the second writing transistor through a via; and a fourth transfer electrode connected to the third transfer electrode through a via, and connected to the second scan line through a via, wherein the first pixel circuit further comprises a fifth transfer electrode, the data line is connected to the fifth transfer electrode through a via, and the fifth transfer electrode is connected to the first electrode of the second writing transistor through a via, wherein the first pixel circuit further comprises:

a sixth transfer electrode; one terminal of the sixth transfer electrode is connected to the first electrode of the first writing transistor through a via, the other terminal of the sixth transfer electrode is connected to the second electrode of the second writing transistor through a via, and an orthographic projection of the sixth transfer electrode on the base substrate at least partially overlaps the orthographic projection of the first electrode of the first light emitting device on the base substrate, wherein an orthographic projection of an active layer of the first writing transistor on the base substrate at least partially overlaps the orthographic projection of the first electrode of the first light emitting device on the base substrate, and an orthographic projection of an active layer of the second writing transistor on the base substrate is within the orthographic projection of the first electrode of the first light emitting device on the base substrate, wherein the first pixel circuit further comprises:

a seventh transfer electrode having one terminal connected to the second electrode of the first writing transistor through a via and having the other terminal connected to the gate electrode of the driving transistor through a via; an orthographic projection of the seventh transfer electrode on the base substrate at least partially overlaps the orthographic projection of the first electrode of the first light emitting device on the base substrate.

5. The display substrate of claim 1, wherein the first pixel circuit further comprises: an eighth transfer electrode and a ninth transfer electrode;

the first voltage line is connected to the ninth transfer electrode through a via, the ninth transfer electrode is connected to the eighth transfer electrode through a via, and the eighth transfer electrode is connected to the first electrode of the driving transistor through a via, wherein the two plates of the storage capacitor comprise: a first plate and a second plate; the gate electrode of the driving transistor and the first plate have a one-piece structure, and the eighth transfer electrode is further connected to the second plate through a via; an orthographic projection of the second plate on the base substrate at least partially overlaps the orthographic projection of the first electrode of the first light emitting device on the base substrate.

6. The display substrate of claim 1, wherein the luminescent control sub-circuit comprises: a luminescent control transistor; a gate electrode of the luminescent control transistor is connected to a luminescent control line for providing the luminescent control signal, a first electrode of the luminescent control transistor is connected to the second electrode of the driving transistor, and a second electrode of the luminescent control transistor is connected to the first electrode of the first light emitting device.

7. The display substrate of claim 6, wherein the first pixel circuit further comprises: a tenth transfer electrode and an eleventh transfer electrode; the luminescent control line is connected to the eleventh transfer electrode through a via, the eleventh transfer electrode is connected to the tenth transfer electrode through a via, and the tenth transfer electrode is connected to the gate electrode of the luminescent control transistor through a via, wherein the first and second electrodes of the luminescent control transistor are arranged in a second direction, and an orthographic projection of the storage capacitor on the base substrate is on a side of an orthographic projection of the first electrode of the luminescent control transistor on the base substrate in a first direction, and the first direction and the second direction intersect with each other.

8. The display substrate of claim 1, wherein the reset sub-circuit comprises: a reset transistor; a gate electrode of the reset transistor is connected to a second scan line for providing the second scan signal, a first electrode of the reset transistor is connected to an initialization voltage line for providing the initialization voltage signal, and a second electrode of the reset transistor is connected to a first electrode of the first light emitting device, wherein the first pixel circuit further comprises: a twelfth transfer electrode and a thirteenth transfer electrode; the initialization voltage line is connected to the thirteenth transfer electrode through a via, the thirteenth transfer electrode is connected to the twelfth transfer electrode through a via, and the twelfth transfer electrode is connected to the first electrode of the reset transistor through a via, wherein the first pixel circuit further comprises: a fourteenth transfer electrode, a fifteenth transfer electrode and a sixteenth transfer electrode; the first electrode of the light emitting device is connected to the sixteenth transfer electrode through a via, the sixteenth transfer electrode is connected to the fifteenth transfer electrode through a via, the fifteenth transfer electrode is connected to the fourteenth transfer electrode through a via, and the fourteenth transfer electrode is connected to the second electrode of the reset transistor through a via, wherein the first and second electrodes of the reset transistor are arranged along a first direction, and an orthographic projection of the reset transistor on the base substrate is on a side of an orthographic projection of the storage capacitor on the base substrate in a second direction, wherein the data writing sub-circuit comprises a first writing transistor and a second writing transistor, and a gate electrode of the second writing transistor and the gate electrode of the reset transistor have a one-piece structure extending in a second direction.

9. The display substrate of claim 1, wherein the display substrate comprises: a first semiconductor layer, a first gate metal layer, a second gate metal layer, a second semiconductor layer, a third gate metal layer, a transparent wire layer, and a first electrode layer arranged in sequence in a direction away from the base substrate, wherein the first pixel circuit comprises at least one polysilicon transistor and at least one oxide transistor; and the first semiconductor layer comprises an active layer, a first electrode, and a second electrode of each polysilicon transistor in the first pixel circuit; the first gate metal layer comprises a gate electrode of each polysilicon transistor in the first pixel circuit; the second gate metal layer comprises a first gate electrode of each oxide transistor in the first pixel circuit and a first plate of the storage capacitor; the second semiconductor layer comprises an active layer, a first electrode and a second electrode of each oxide transistor in the first pixel circuit; the third gate metal layer comprises a second plate of the storage capacitor; the transparent wire layer comprises the first voltage line; and the first electrode layer comprises the first electrode of the first light emitting device.

10. The display substrate of claim 9, wherein the data writing sub-circuit comprises a first writing transistor having a gate electrode comprising a first gate electrode and a second gate electrode, the transparent wire layer further comprises a first scan line, and the display substrate further comprises a first source-drain metal layer and a second source-drain metal layer between the third gate metal layer and the transparent wire layer, wherein the second source-drain metal layer is on a side of the first source-drain metal layer away from the base substrate, and the first source-drain metal layer comprises a first transfer electrode, and the second source-drain metal layer comprises a second transfer electrode; the first scan line is connected to the second transfer electrode through a via, the second transfer electrode is connected to the first transfer electrode through a via, and both terminals of the first transfer electrode are connected to the first gate electrode and the second gate electrode of the first writing transistor through vias, respectively.

11. The display substrate of claim 10, wherein the data writing sub-circuit further comprises a second writing transistor, the transparent wire layer further comprises a second scan line, the first source-drain metal layer further comprises a third transfer electrode, the second source-drain metal layer further comprises a fourth transfer electrode; the second scan line is connected to the fourth transfer electrode through a via, the fourth transfer electrode is connected to the third transfer electrode through a via, and the third transfer electrode is connected to a gate electrode of the second writing transistor through a via, wherein the transparent wire layer further comprises a data line, the first source-drain metal layer further comprises a fifth transfer electrode; the data line is connected to the fifth transfer electrode through a via, and the fifth transfer electrode is connected to a first electrode of the second writing transistor through a via, wherein the first source-drain metal layer further comprises a sixth transfer electrode; one terminal of the sixth transfer electrode is connected to a first electrode of the first writing transistor through a via, and the other terminal of the sixth transfer electrode is connected to a second electrode of the second writing transistor through a via.

12. The display substrate of claim 10, wherein the first source-drain metal layer further comprises a seventh transfer electrode; one terminal of the seventh transfer electrode is connected to a second electrode of the first writing transistor through a via, and the other terminal of the seventh transfer electrode is connected to the gate electrode of the driving transistor through a via.

13. The display substrate of claim 9, wherein the display substrate further comprises a first source-drain metal layer and a second source-drain metal layer between the third gate metal layer and the transparent wire layer, wherein the second source-drain metal layer is on a side of the first source-drain metal layer away from the base substrate; the first source-drain metal layer comprises an eighth transfer electrode, and the second source-drain metal layer comprises a ninth transfer electrode; the first voltage line is connected to the ninth transfer electrode through a via, the ninth transfer electrode is connected to the eighth transfer electrode through a via, the eighth transfer electrode is connected to the first electrode of the driving transistor through a via, and the eighth transfer electrode is connected to the second plate of the storage capacitor through a via.

14. The display substrate of claim 9, wherein the luminescent control sub-circuit comprises a luminescent control transistor; the display substrate further comprises a first source-drain metal layer and a second source-drain metal layer between the third gate metal layer and the transparent wire layer, wherein the second source-drain metal layer is on a side of the first source-drain metal layer away from the base substrate;

the first source-drain metal layer comprises a tenth transfer electrode, the second source-drain metal layer comprises an eleventh transfer electrode, and the transparent wire layer further comprises a luminescent control line connected to the eleventh transfer electrode through a via, and the eleventh transfer electrode is connected to the tenth transfer electrode through a via.

15. The display substrate of claim 9, wherein the reset sub-circuit comprises a reset transistor; the display substrate further comprises a first source-drain metal layer and a second source-drain metal layer between the third gate metal layer and the transparent wire layer, wherein the second source-drain metal layer is on a side of the first source-drain metal layer away from the base substrate; and the transparent wire layer comprises a sixteenth transfer electrode, and the first source-drain metal layer comprises a twelfth transfer electrode and a fourteenth transfer electrode; the second source-drain metal layer comprises a thirteenth transfer electrode and a fifteenth transfer electrode; the transparent wire layer comprises an initialization voltage line, the initialization voltage line is connected to the thirteenth transfer electrode through a via, the thirteenth transfer electrode is connected to the twelfth transfer electrode through a via; the first electrode of the light emitting device is connected to the sixteenth transfer electrode through a via, the sixteenth transfer electrode is connected to the fifteenth transfer electrode through a via, the fifteenth transfer electrode is connected to the fourteenth transfer electrode through a via, and the fourteenth transfer electrode is connected to a second electrode of the reset transistor through a via.

16. The display substrate of claim 1, wherein the plurality of first sub-pixels in the first display region are arranged in rows and columns, the first sub-pixels in a same column are arranged in a first direction, the first sub-pixels in a same row are arranged in a second direction, every two adjacent rows of first sub-pixels form a repeating group, and the two rows of first sub-pixels in the repeating group are arranged in a staggered manner;

the display substrate further comprises:

a plurality of luminescent control lines for providing luminescent control signals, wherein each of the plurality of luminescent control lines corresponds to one of the repeating groups, different luminescent control lines correspond to different repeating groups, respectively, and each of the plurality of luminescent control lines is connected to first pixel circuits of first sub-pixels in a corresponding repeating group of the repeating groups;

a plurality of first scan lines for providing first scan signals, wherein each of the plurality of first scan lines corresponds to one of the repeating groups, different first scan lines correspond to different repeating groups, respectively, and each of the plurality of first scan lines is connected to first pixel circuits of first sub-pixels in a corresponding repeating group;

a plurality of second scan lines for providing second scan signals, wherein each of the plurality of second scan lines corresponds to one of the repeating groups, different second scan lines correspond to different repeating groups, respectively, and each of the plurality of second scan lines is connected to first pixel circuits of first sub-pixels in a corresponding repeating group;

a plurality of initialization voltage lines for providing the initialization voltage signals, wherein each initialization voltage line corresponds to one of the repeating groups, different initialization voltage lines correspond to different repeating groups, each initialization voltage line is connected to the first pixel circuits of the first sub-pixels in the corresponding repeating group; and a plurality of data lines for providing data voltage signals, wherein each of the plurality of data lines corresponds to one column of first sub-pixels, different data lines correspond to different columns of first sub-pixels, respectively, and each of the plurality of data lines is connected to first pixel circuits in a corresponding column of first sub-pixels.

17. The display substrate of claim 16, wherein in a same repeating group, one row of first sub-pixels are sub-pixels of a first color, and the other row of sub-pixels comprise sub-pixels of a second color and sub-pixels of a third color arranged alternately, the luminescent control line comprises a control line main body extending in the second direction and a control line lead-out portion extending in the first direction; and in a same repeating group, the first pixel circuits in one row of first sub-pixels are connected to the control line main body, and the first pixel circuits in the other row of first sub-pixels are connected to the control line leading-out portion.

18. The display substrate of claim 16, wherein the first scan line comprises a scan line main body and a scan line lead-out portion; the scan line main body comprises a plurality of scan line segments sequentially arranged in the second direction, the plurality of scan line segments are sequentially connected together such that the scan line main body is formed as a bending structure; the scan line leading-out portion extends in the first direction; and in a same repeating group, the first pixel circuits in one row of first sub-pixels are connected to the scan line main body, and the first pixel circuits in the other row of first sub-pixels are connected to the scan line leading-out portion.

19. A display apparatus, comprising the display substrate of claim 1, wherein the display apparatus further comprises at least one image sensor, and an orthographic projection of the at least one image sensor on the base substrate is in the first display region.

* * * * *